(12) United States Patent
Xie et al.

(10) Patent No.: US 6,590,706 B1
(45) Date of Patent: *Jul. 8, 2003

(54) OPTICAL CIRCULATORS USING BEAM ANGLE TURNERS

(75) Inventors: Ping Xie, San Jose, CA (US); Yonglin Huang, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/658,854

(22) Filed: Sep. 8, 2000

Related U.S. Application Data

(63) Continuation of application No. 09/186,751, filed on Nov. 5, 1998, now Pat. No. 6,175,448, which is a continuation-in-part of application No. 09/135,083, filed on Aug. 17, 1998, now Pat. No. 6,049,426.

(51) Int. Cl.[7] .................................................. G02B 5/30
(52) U.S. Cl. ........................ 359/495; 359/496; 359/497
(58) Field of Search ................................. 359/484, 495, 359/496, 497, 122, 494; 385/11, 36

(56) References Cited

U.S. PATENT DOCUMENTS

| | | | |
|---|---|---|---|
| 3,781,714 A | 12/1973 | Schlossberg | 331/94.5 |
| 4,294,509 A | 10/1981 | Nagao | 350/96.15 |
| 4,464,022 A | 8/1984 | Emkey | 350/377 |
| 4,548,478 A | 10/1985 | Shiraski | 350/377 |
| 4,554,449 A | 11/1985 | Taniuchi et al. | 250/227 |
| 4,720,162 A | 1/1988 | Mochizuki et al. | 350/96.15 |
| 4,741,588 A | 5/1988 | Nicia et al. | 350/96.19 |
| 4,761,050 A | 8/1988 | Byron | 350/96.15 |
| 4,805,977 A | 2/1989 | Tamura et al. | 350/96.16 |
| 4,960,331 A | 10/1990 | Goldman et al. | 356/350 |
| 5,033,830 A | 7/1991 | Jameson | 350/403 |
| 5,089,785 A | 2/1992 | Hand | 328/233 |

(List continued on next page.)

FOREIGN PATENT DOCUMENTS

| | | | |
|---|---|---|---|
| DE | 196 30 737 | 8/1995 | G02F/1/39 |
| DE | 196 30 737 A1 | 2/1997 | G02F/1/39 |
| EP | 0 576 072 A1 | 12/1993 | G02B/27/28 |
| EP | 0 653 661 A | 5/1995 | G02B/1/09 |
| EP | 0 814 361 A1 | 12/1997 | G02F/1/09 |
| EP | 0 965 867 A1 | 12/1999 | G02B/6/26 |
| GB | 2 264 181 A | 2/1993 | G02F/1/09 |
| JP | 8094969 | 4/1996 | |
| WO | WO 90/15357 | 12/1990 | G02B/27/28 |
| WO | WO 96/19743 | 6/1996 | G02B/6/26 |
| WO | WO 97/22034 | 11/1997 | G02B/6/26 |
| WO | WO 98 23983 A | 6/1998 | G02B/1/09 |

*Primary Examiner*—John Juba
*Assistant Examiner*—Lee Fineman
(74) *Attorney, Agent, or Firm*—Fish & Richardson P.C.

(57) ABSTRACT

An apparatus for optically circulating light beams between ports is disclosed, with a first port and third port positioned at a proximal end of the apparatus, a second port positioned at a distal end of the apparatus. The apparatus includes a first beam bender. The apparatus may additionally comprise end portions and imaging elements. The first and second end portions are positioned at either end of the apparatus to impart a propagation direction dependent polarization to the first light beam and the second light beam. The first imaging element and the second imaging element are positioned between the first and second end portions. The first imaging element bends the first light beam to a focal point between the first and the second imaging element. The second imaging element bends the second light beam to the focal point.

4 Claims, 26 Drawing Sheets

U.S. PATENT DOCUMENTS

| | | | |
|---|---|---|---|
| 5,115,340 A | 5/1992 | Tidwell | 359/484 |
| 5,191,467 A | 3/1993 | Kapany et al. | 359/341 |
| 5,204,771 A | 4/1993 | Koga | 359/281 |
| 5,212,586 A | 5/1993 | Van Delden | 359/281 |
| 5,272,560 A | 12/1993 | Baney et al. | 359/249 |
| 5,303,314 A | 4/1994 | Duling, III et al. | 385/11 |
| 5,319,483 A | 6/1994 | Krasinski et al. | 359/113 |
| 5,471,340 A | 11/1995 | Cheng et al. | 359/281 |
| 5,546,219 A | 8/1996 | Iida | 359/281 |
| 5,557,692 A | 9/1996 | Pan et al. | 385/11 |
| 5,559,633 A | 9/1996 | Emkey | 359/484 |
| 5,566,259 A | 10/1996 | Pan et al. | 385/11 |
| 5,574,595 A | 11/1996 | Kurata | 359/484 |
| 5,574,596 A | 11/1996 | Cheng | 359/484 |
| 5,682,446 A | 10/1997 | Pan et al. | 385/11 |
| 5,689,367 A | 11/1997 | Pan et al. | 359/495 |
| 5,689,593 A | 11/1997 | Pan et al. | 385/11 |
| 5,706,371 A | 1/1998 | Pan | 385/11 |
| 5,729,377 A | 3/1998 | Bergmann | 359/249 |
| 5,734,763 A | 3/1998 | Chang | 385/11 |
| 5,740,288 A | 4/1998 | Pan | 385/11 |
| 5,818,981 A | 10/1998 | Pan et al. | 385/11 |
| 5,850,493 A | 12/1998 | Cheng | 385/34 |
| 5,909,310 A | 6/1999 | Li et al. | 359/484 |
| 5,930,039 A | 7/1999 | Li et al. | 359/484 |
| 5,941,076 A | 8/1999 | Sandelis | 60/752 |
| 5,956,441 A | 9/1999 | Fairchild et al. | 385/27 |
| 5,982,539 A | 11/1999 | Shirasaki | 359/484 |
| 6,011,649 A | 1/2000 | Chang | 359/484 |
| 6,014,244 A | 1/2000 | Chang | 359/281 |
| 6,014,475 A * | 1/2000 | Frisken | 359/281 |
| 6,026,202 A | 2/2000 | Chang | 385/11 |
| 6,049,426 A * | 4/2000 | Xie et al. | 359/484 |
| 6,052,228 A * | 4/2000 | Xie et al. | 359/496 |
| 6,088,491 A | 7/2000 | Sorin et al. | 385/11 |
| 6,175,448 B1 * | 1/2001 | Xie et al. | 359/497 |
| 6,212,008 B1 * | 4/2001 | Xie et al. | 359/484 |
| 6,285,499 B1 * | 9/2001 | Xie et al. | 359/484 |

\* cited by examiner

BEAM SHIFTER

PRIOR ART

BEAM BENDER

PRIOR ART

WOLLASTON PRISM (Modified)

ROCHON PRISM (Modified)
FIG. 6A
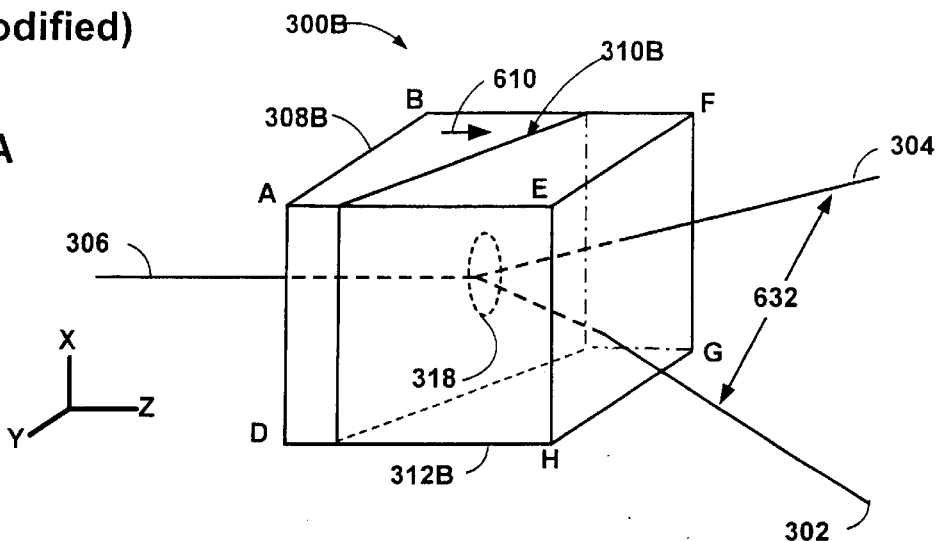
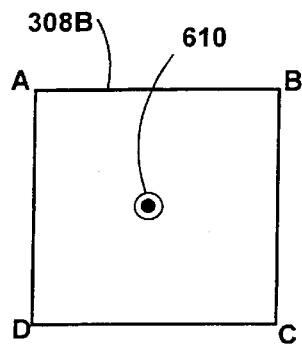
FIG. 6B
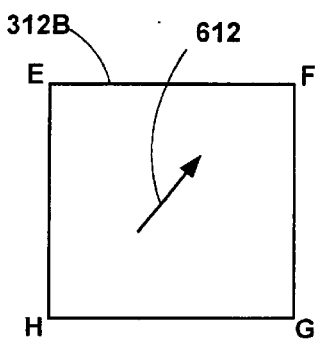
FIG. 6C
FIG. 6D
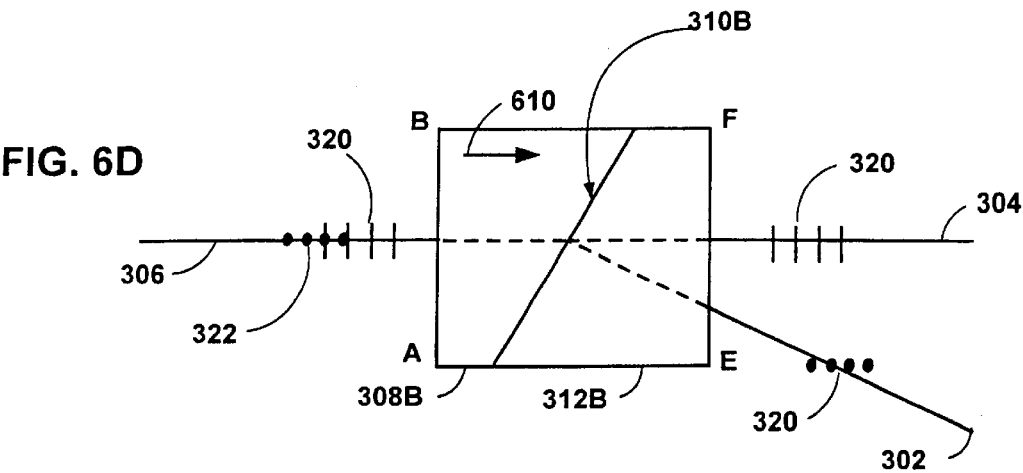

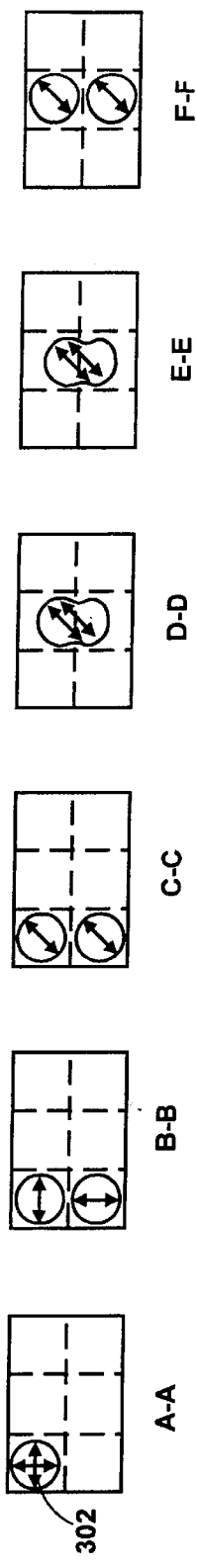
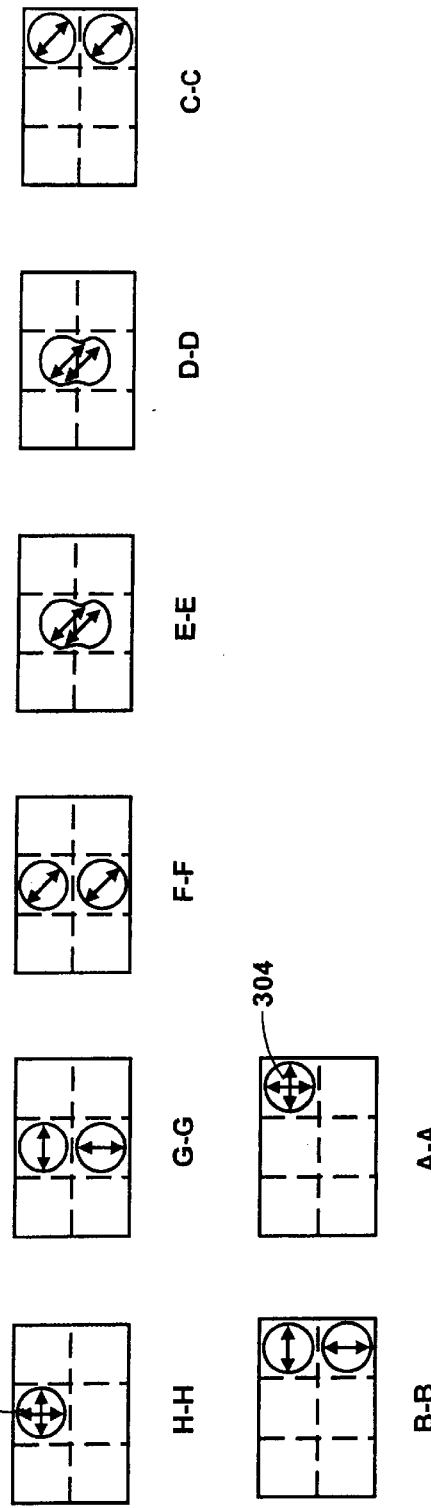
FIG. 9A
FIG. 9B

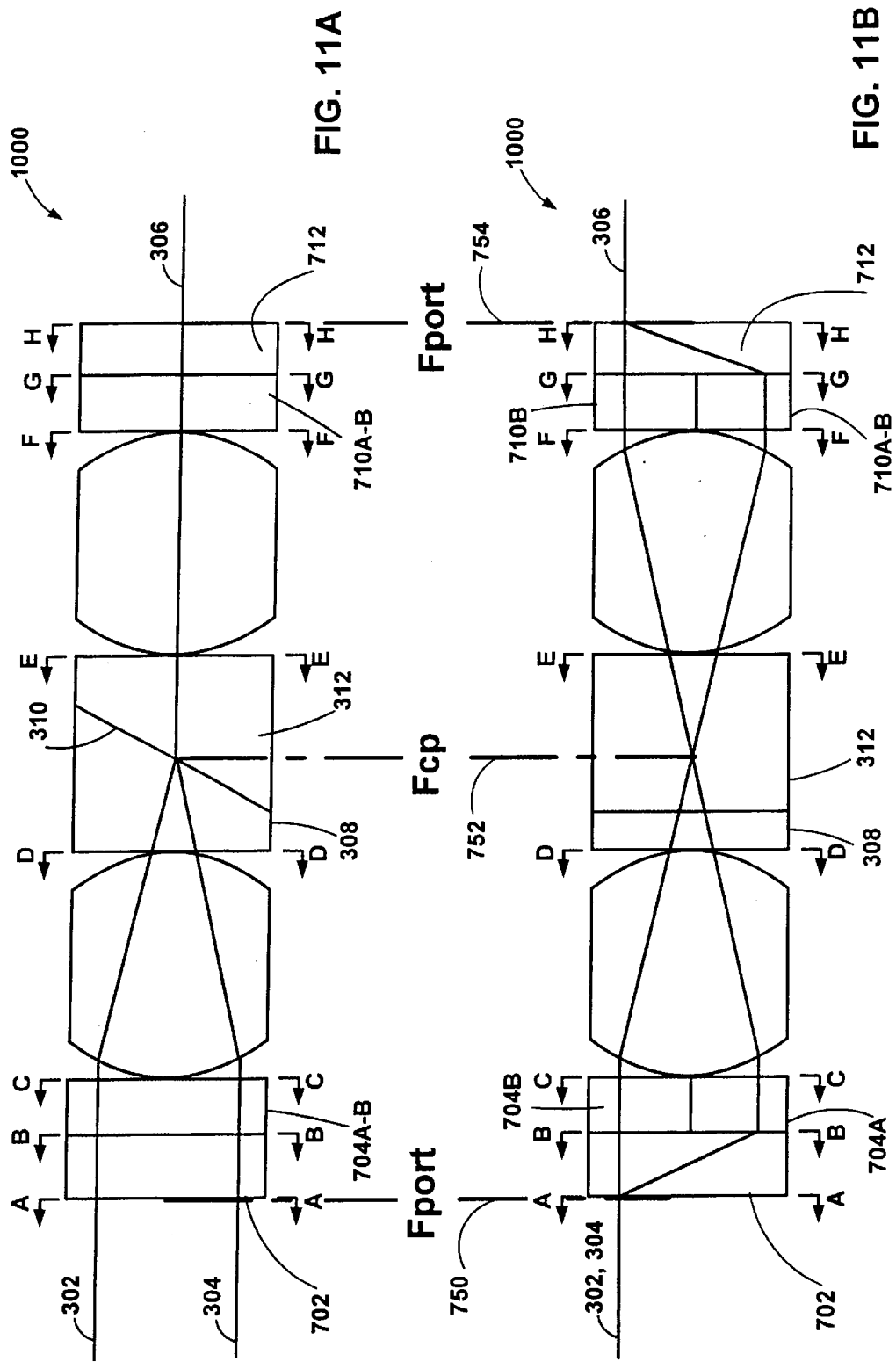

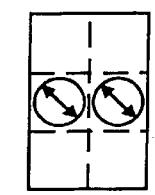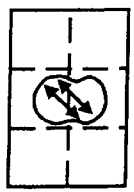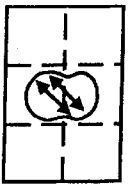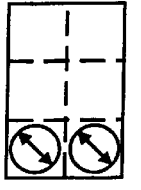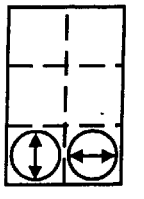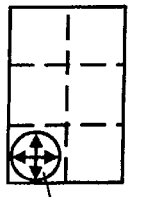
FIG. 12A
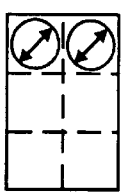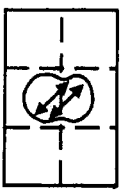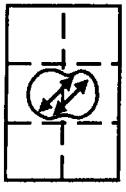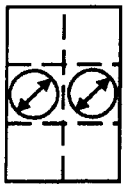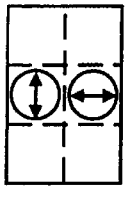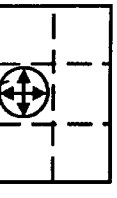
FIG. 12B

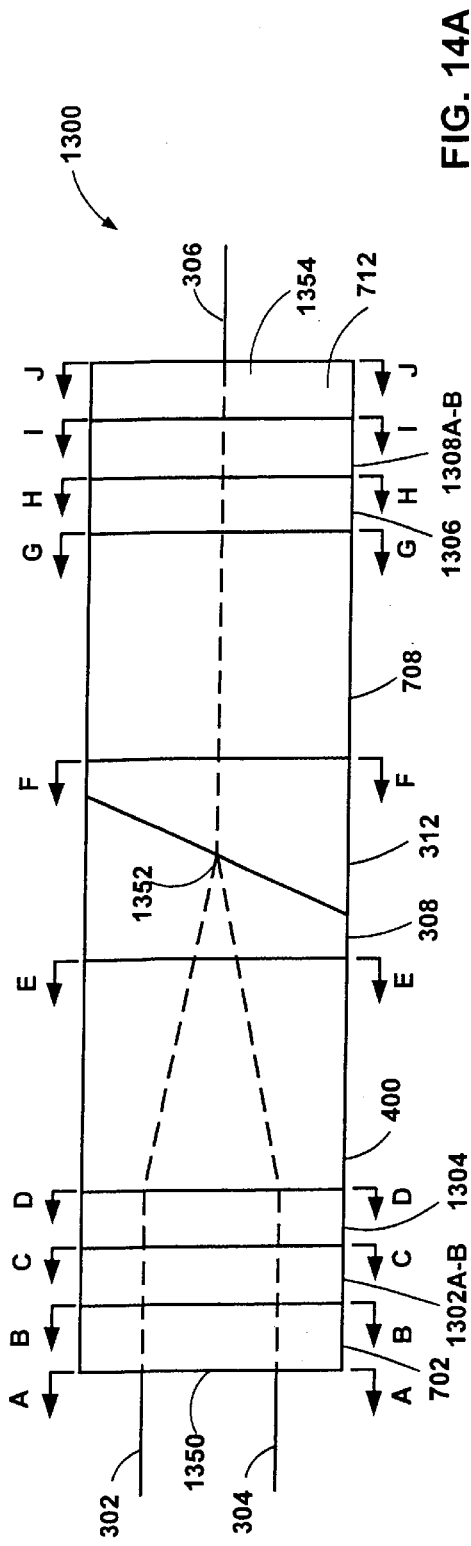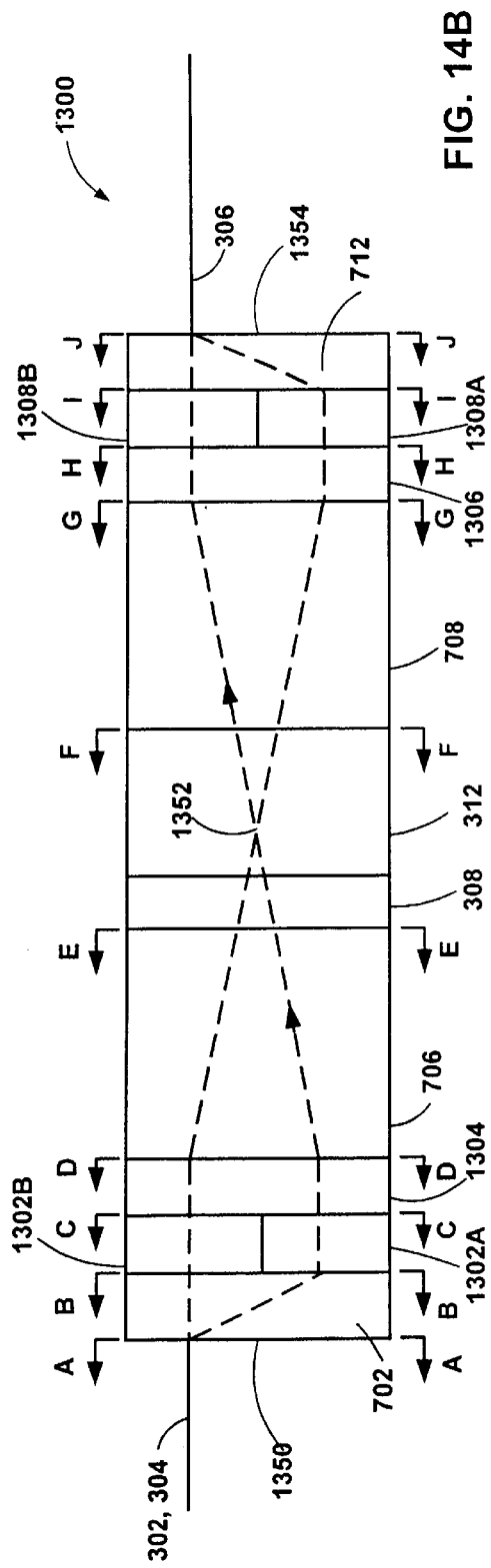

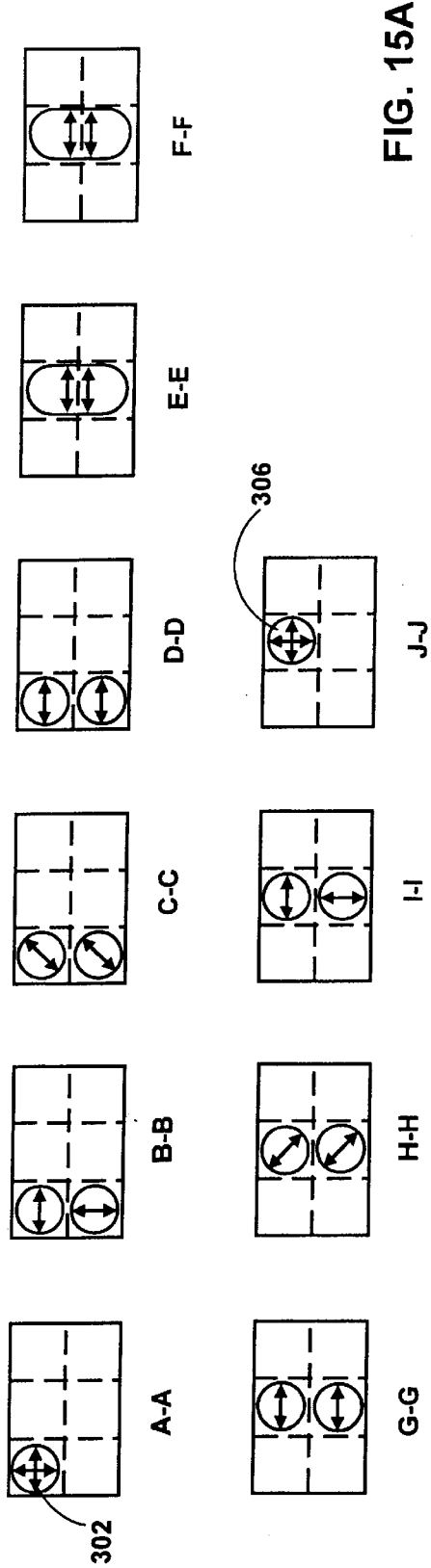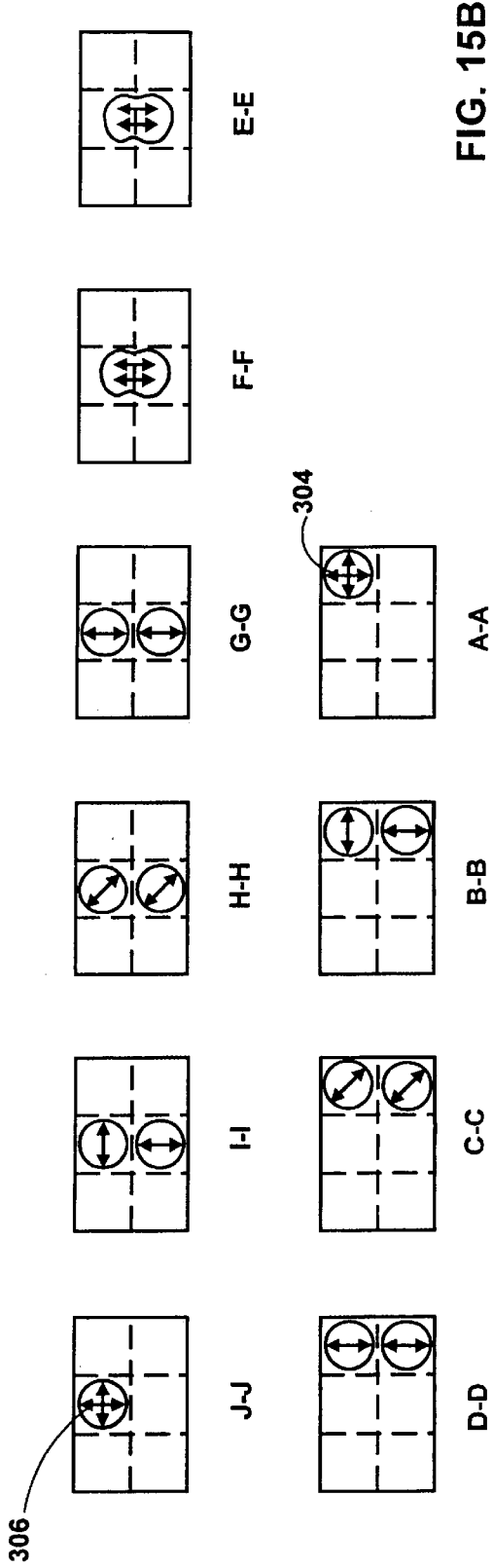
FIG. 15A
FIG. 15B

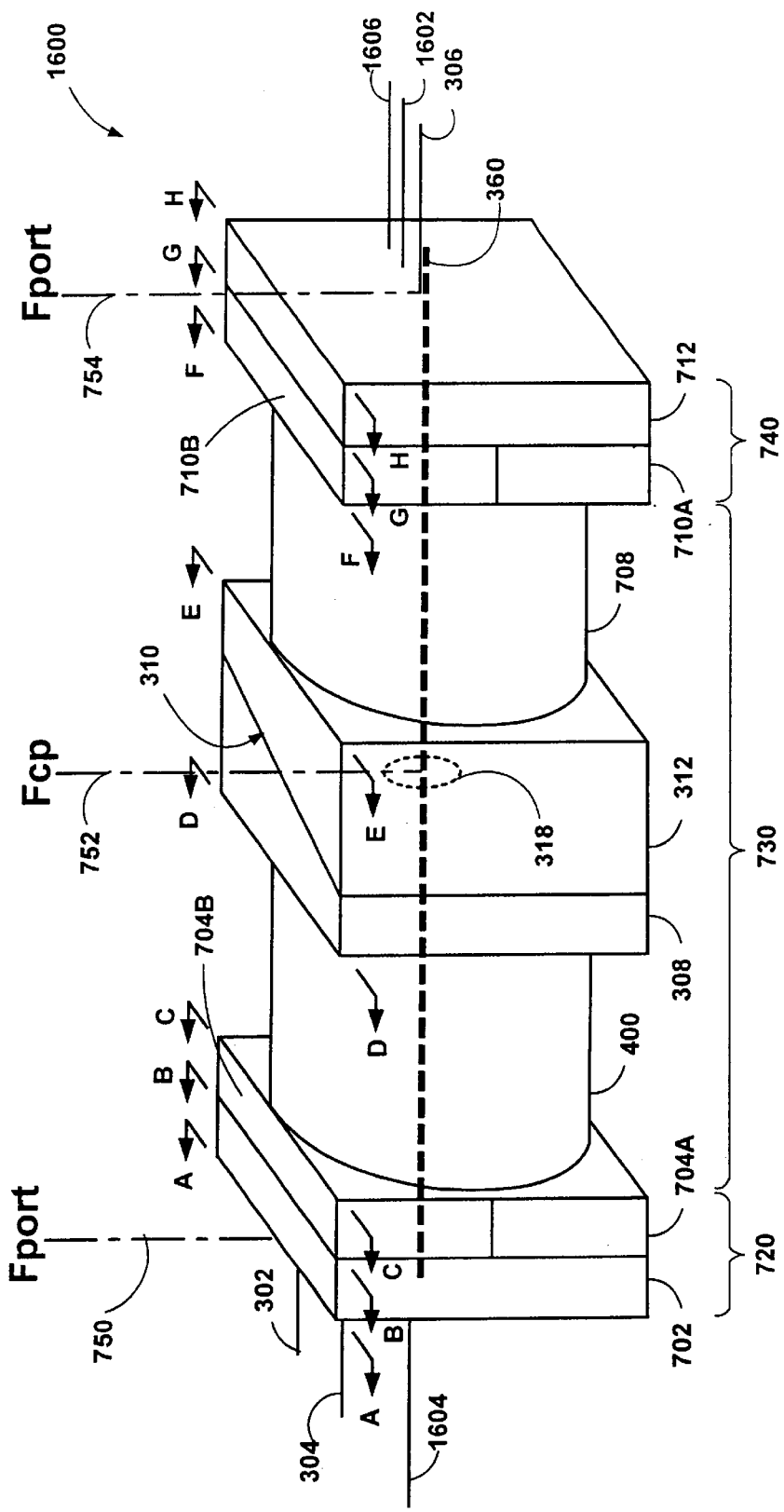
FIG. 16 MULTI-PORT

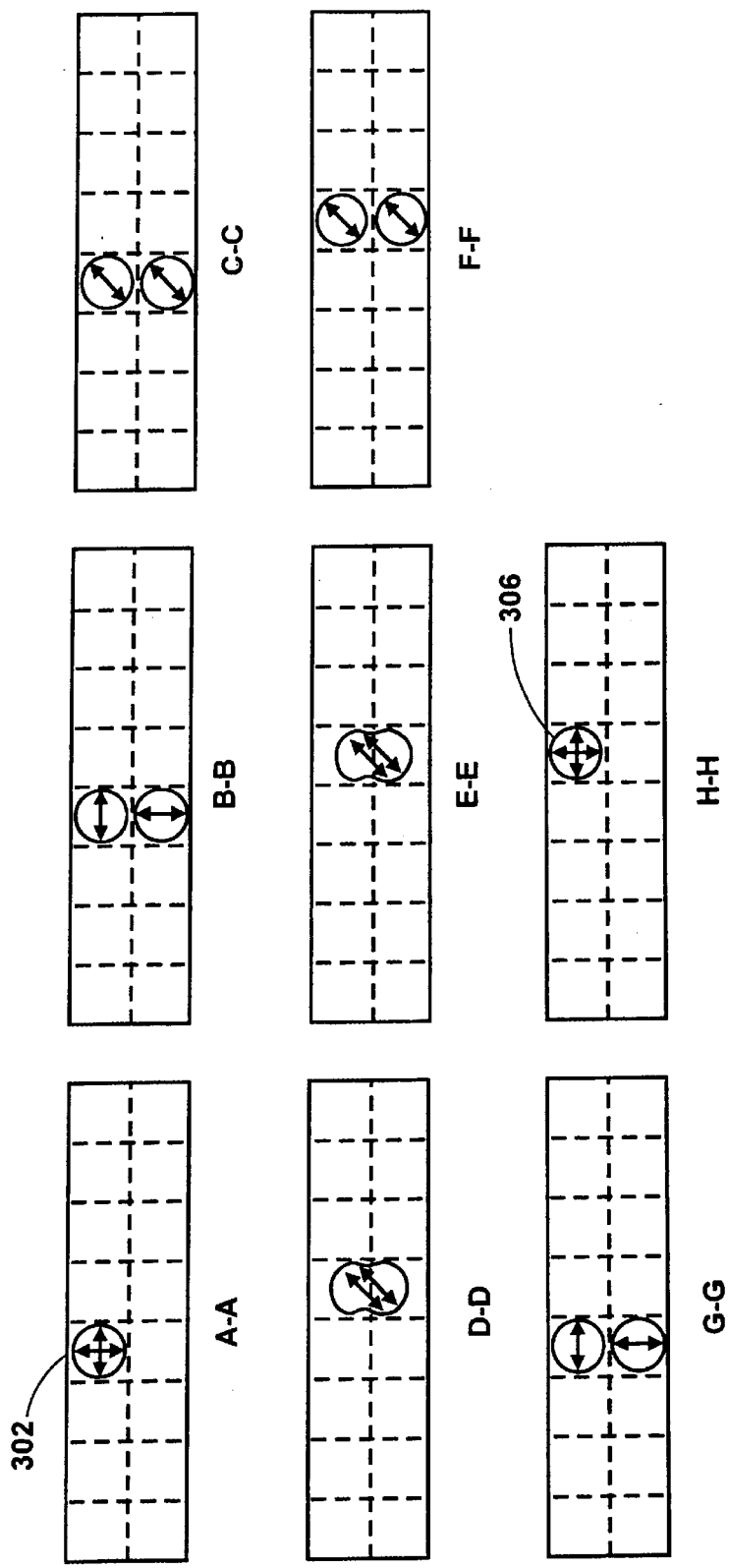

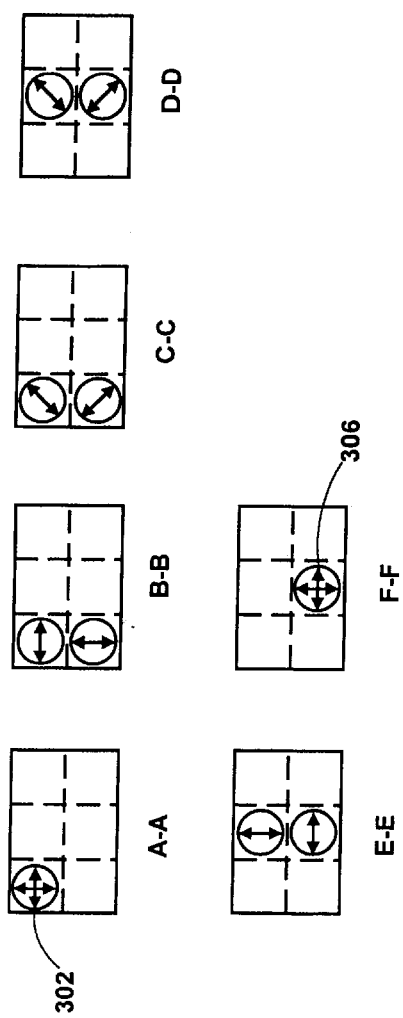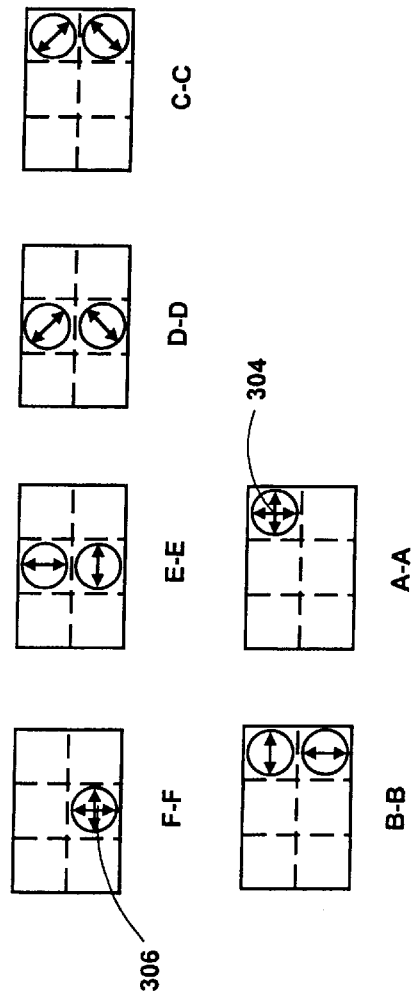

OPTICAL CIRCULATORS USING BEAM ANGLE TURNERS

REFERENCE TO RELATED APPLICATIONS

This application is a continuation of U.S. patent application Ser. No. 09/186,751, filed Nov. 5, 1998, now U.S. Pat. No. 6,175,448 issued Jan. 16, 2001, which was a CIP of U.S. patent application Ser. No. 09/135,083, filed on Aug. 17, 1998, now U.S. Pat. No. 6,049,426 issued Apr. 11, 2000. All of these applications are incorporated herein by reference.

BACKGROUND OF THE INVENTION

1. Field of the Invention

The invention relates to optical devices; more particularly, it relates to optical circulators.

2. Description of Related Art

An optical circulator is a nonreciprocal, typically three-port or four-port, device. Light entering the first port passes out the second port, but light entering the second port cannot pass back to the first port. Instead, it passes out of the third port. By installing an optical circulator at each end of a fiber link, an existing unidirectional fiber optic communication link can be quickly and economically converted to a bidirectional one. Such a modification results in a doubled bit carrying capacity. An optical circulator can also be used in applications such as wavelength division multiplexer (WDM), Erbium-doped fiber amplifier (EDFA), add-drop multiplexers, dispersion compensators and optical time domain reflectometers (OTDR's).

Optical circulators can be a key element in today's optical networks. However, they have not been widely adopted because of their high cost. A typical optical circulator usually comprises many optical elements and has a large optical footprint. Manufacturing of conventional optical circulators usually requires precise alignment of each optical element, leading to low yields and high production costs.

An early concept of a polarization independent optical circulator for telecommunication use was disclosed in Matsumoto, U.S. Pat. No. 4,272,159. This document, and all others referred to herein, are incorporated by reference as if reproduced fully herein.

Optical circulators have been described in patents, including the above-mentioned Matsumoto, U.S. Pat. No. 4,272,159; Emkey, U.S. Pat. No. 4,464,022; and Kuwahara, U.S. Pat. No. 4,650,289. However, these early optical circulators often suffer from high insertion loss and/or cross-talk that is unacceptable for many communication applications. Insertion loss may be defined as the difference between the power between light launched into the optical circulator and the power that exits the device. Insertion loss is largely due to coupling loss from fiber to fiber, absorption of light and to imperfect polarization separation. Cross-talk in an optical circulator refers to the amount of power emitted at an optical port to the receiver from light entering at an adjacent optical port from the transmitter. The conventional polarizing cubes used in these prior optical circulators often cause large insertion loss and cross-talk because of their low polarization extinction ratio.

Optical Circulators Using Beam Shifters

Koga, U.S. Pat. Nos. 5,204,771; 5,319,483 and Cheng U.S. Pat. Nos. 5,471,340; 5,574,596, disclose optical circulators using beam shifters. The beam path determining means of these patents shift a beam such that it possesses the same propagation direction but is spatially located in a different portion of the circulator. In this sense, the input beam to and output beam from the beam path determining means are parallel in propagation direction but are shifted in spatial location. A disadvantage of the Koga and Chen circulators is that the construction of these circulators demands precise fabrication of birefringent crystals and waveplates. These types of circulators are therefore often difficult and costly to make. The length of beam shifter in these circulators required to obtain adequate beam separation is also excessively large thus resulting in a large form factor.

Another drawback of the Cheng circulators is that polarization mode dispersion ("PMD") in the circulators is not eliminated unless additional compensation crystals are introduced. Such additional crystals add cost and complexity. Polarization mode dispersion (PMD) is introduced in an optical component when signal energy at a given wavelength is resolved into two orthogonal polarization modes of slightly different propagation velocity or optical path. The resulting difference in propagation time between polarization modes is also called differential group delay. PMD causes a number of serious capacity impairments, including pulse broadening. In addition, alignment of this type of circulators depends on sub-micron precision positioning of single mode fibers. Therefore, manufacturing of PMD-corrected Cheng circulators is non-trivial.

FIGS. 1A–B show respectively an isometric and a cross-sectional view of a walk-off crystal such as that employed in the Cheng and Koga references. Walk off crystals can be used either for splitting a natural light beam into orthogonally polarized rays, or for circulating light beams with orthogonal polarization components. FIG. 1A shows the later case in which a light beams 150–152 with orthogonal polarization states, circulate between respectively ports 106–104 and ports 102–106 of walk-off crystal 100.

FIG. 1B is a cross-sectional view at principal plane ABCD of the crystal 100 shown in FIG. 1A. The optical axis 108 of the crystal is located in the principal plane and at an acute angle that is typically at around 45 degree with respect to the front surface of birefringent crystal, defined by the plane including AD. The polarization vector, i.e. electric field vector, 118 of ray 150 is normal to the principal section. Thus the propagation vector 124 and Poynting vector 126 for the ray 150 are substantially collinear and no walk-off is exhibited as the ray passes through the crystal to port 104. The polarization, i.e. electric field vector, 116 of ray 152 is parallel to the principal section. Thus the propagation vector 120 and Poynting vector 122 for the ray 152 are not collinear and walk-off is exhibited as the ray passes through the crystal to port 106. The complete explanation of this walk-off effect can be found using electromagnetic theory as embodied in Maxwell's equations. Further explanation, using Huygen's principle, may be found in Hecht, Optics 288 (1987) (2d ed. Addison-Wesley).

Optical Circulators Using Beam Benders

Pan et al., U.S. Pat. Nos. 5,682,446; 5,818,981; 5,689,367 and 5,689,593, describe another type of circulator in which optical ports, beam splitters and non-reciprocal rotators are radially arranged about a polarization sensitive prism pair and associated air gap. Circulation is achieved by polarization sensitive reflection or transmission of an incident light beam from or through the air gap defined between the prism pair as shown in FIG. 2. The length of the beam splitters coupled with the radial arrangement of the ports makes for a circular form factor. The arrangement is bulky and expensive.

FIG. 2 shows an isometric view of a circulating element such as that employed in the Pan et al. references. Prism pair 208, 212 defines an air gap 210 between internal faces 208A, 212A. The prism pair and air gap function as an optical circulator 200 by reflecting and transmitting orthogonally polarized light beams respectively 250–252. Light beam 250 with polarization vector 222 propagates between ports 204 and 202 by entering prism 208 at a normal to face 208C, by internally reflecting off face 208A and air gap 210 within prism 208 and by exiting the prism 208 on a normal to face 208B toward port 202. Light beam 252 with polarization vector 220 propagates between ports 206 and 202 by entering prism 212 on a normal to face 212B, by transmission through gap 210 into prism 208 on a normal to face 208A and by exiting the prism 208 on a normal to 208B toward port 202.

In order to achieve this effect, i.e. polarization sensitive transmission and reflection, several requirements must be met. First, the prisms must have an optical axis. Second, the prisms 208, 212 are separated by an air gap 210 defined between opposing interior faces 208A, 212A of respectively prisms 208, 212. The gap must be greater than the wavelength of the light being transmitted and the interior faces should be parallel. Third, ray 250 must intercept the gap at an angle of incidence greater than a critical angle $\theta c$ where $\theta c = \text{ArcTan}(n)$ and n is the corresponding index of refraction of prism 208 for the polarization vector 222 of ray 250. Fourth, each port enters the corresponding one of the prism pairs through a dedicated face at an angle normal to the face. Fifth, the angle 230 between ports 202–204 is a large angle, e.g. 80°, since the internal reflection experienced by beam requires that the beam enter the prism at a near grazing angle of incidence with respect to the internal face 208A through face 208C.

Given the above-mentioned problems with prior art optical circulators, there is a need for a simplified optical circulator comprised of simple optical elements with reduced polarization mode dispersion that is suitable for volume manufacturing.

SUMMARY OF THE INVENTION

An apparatus for optically circulating light is disclosed. An optical prism circulates orthogonally polarized beams along a generally longitudinal optical path. The orthogonally polarized beams are differentially bent as they are transmitted through a center portion of the wedge face of the prism. The net differential bending between the two orthogonally polarized beams is determined by the wedge angle of the prism, the index of refraction of each principal axis and the difference of the two principal indices.

In an embodiment of the invention, an apparatus for circulating light beams between ports is disclosed, with a first port positioned at a proximal end of the apparatus, a second port positioned at a distal end of the apparatus, and a third port positioned at the proximal end of the apparatus. The first port is capable of transmission of a first light beam and the second port is capable of transmission of a second light beam. The apparatus includes a first beam bender. The first beam bender has opposing first and second faces at an angle to one another. The first face and the second face intersect a longitudinal axis extending from the proximal to the distal end of the optical circulator. The beam bender is responsive to a polarization orientation of the first light beam to refract the first light beam toward the second port. The beam bender is further responsive to a polarization orientation of the second light beam to refract the second light beam toward the third port.

In another embodiment of the invention, the apparatus comprises the first beam bender, a first end portion and a second end portion. The first beam bender is positioned between the first end portion and the second end portion. The first end portion and a second end portion are positioned at respectively the proximal end and the distal end of the apparatus to impart a propagation direction dependent polarization to the first light beam and the second light beam.

In still another embodiment of the invention, the apparatus comprises a first end portion, a second end portion, a first imaging element, a second imaging element and a first beam bender. The first end portion and the second end portion are positioned at respectively the proximal end and the distal end of the apparatus to impart a propagation direction dependent polarization to the first light beam and the second light beam. The first imaging element and the second imaging element are positioned between the first and second end portions with the first imaging element proximate the first end portion and the second imaging element proximate the second end portion. The first imaging element bends the first light beam to intersect a focal point between the first and the second imaging element and collimates the first light beam. The second imaging element bends the second light beam to intersect the focal point and collimates the second light beam. The first beam bender is positioned proximate the focal point and is responsive to a polarization orientation of the first light beam to refract the first light beam toward the second port, and is further responsive to a polarization orientation of the second light beam to refract the second light beam toward the third port.

In another embodiment of the invention, an apparatus for circulating light beams between ports is disclosed, with a first port positioned at a proximal end of the apparatus, a second port positioned at a distal end of the apparatus, and a third port positioned at the proximal end of the apparatus. The first port is capable of transmission of a first light beam and the second port is capable of transmission of a second light beam. The apparatus includes a beam bender. The beam bender has opposing first and second faces and between the first and second faces a center plane defined by separate regions of the beam bender with orthogonal optic axis. The first and second faces and the center plane intersect a longitudinal axis extending from the proximal to the distal end of the optical circulator. The beam bender is responsive to a polarization orientation of the first light beam to refract the first light beam toward the second port. The beam bender is further responsive to a polarization orientation of the second light beam to refract the second light beam toward the third port.

In still another embodiment of the invention an apparatus for circulating light beams between a first and a second set of the ports positioned on respectively a proximal end and a distal end of the apparatus. The apparatus includes: a polarization sensitive element and a first and second imaging element. The polarization sensitive element includes a proximal and a distal end. The polarization sensitive element transmits a linearly polarized light beam in directions responsive to a polarization orientation of the linearly polarized light beam. The first imaging element is positioned adjacent the proximal end of the polarization sensitive element. The first imaging element bends and collimates a first set of light beams from each of the first set of ports to intersect the polarization sensitive element. The second imaging element is positioned adjacent the distal end of the polarization sensitive element. The second imaging element bends and collimates the second set of light beams from each of the second set of ports to intersect the polarization sensitive element.

BRIEF DESCRIPTION OF THE DRAWINGS

FIGS. 5A–D, 6A–D show alternate embodiments of the optical circulator of FIG. 3.

FIGS. 9A–B are graphs showing the spatial location and polarization states of the light beams traveling through the optical circulator of FIG. 7.

FIGS. 11A–B show top and side views of the optical circulator of FIG. 10.

FIGS. 12A–B are graphs showing the spatial location and polarization states of the light beams traveling through the optical circulator of FIG. 10.

FIGS. 14A–B show top and side views of the optical circulator of FIG. 13.

FIGS. 15A–B are graphs showing the spatial location and polarization states of the light beams traveling through the optical circulator of FIG. 13.

FIG. 16 shows an isometric view of the optical circulator of FIG. 7 with six ports.

FIGS. 18A–E are graphs showing the spatial location and polarization states of the light beams traveling through the optical circulator of FIG. 16.

FIGS. 21A–B are graphs showing the spatial location and polarization states of the light beams traveling through the optical circulator of FIG. 19.

DETAILED DESCRIPTION OF THE INVENTION

Figures 1A, 1B:
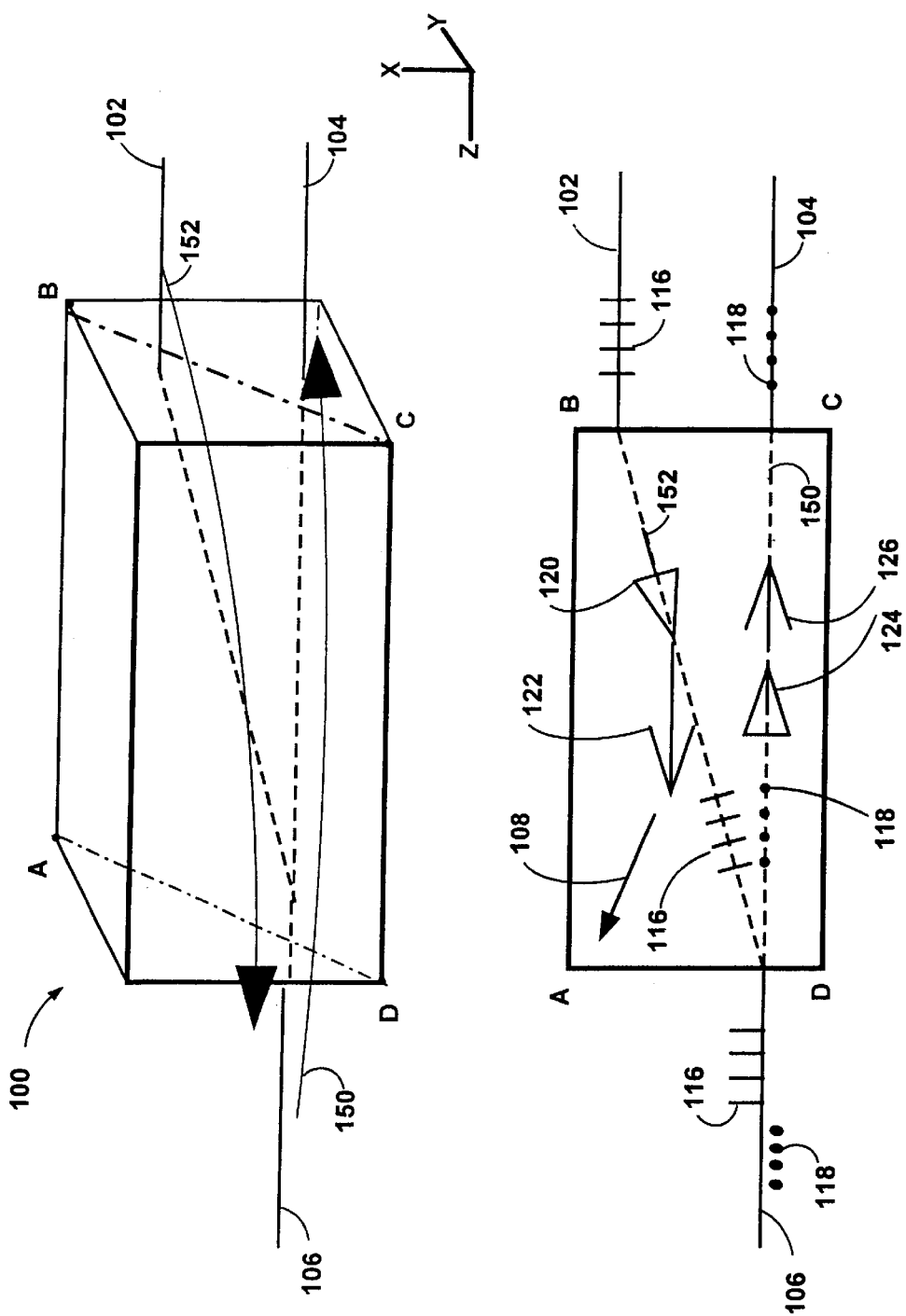
FIGS. 1A–B show respectively an isometric and a cross-sectional view of a Prior Art walk-off crystal.
Figure 2:
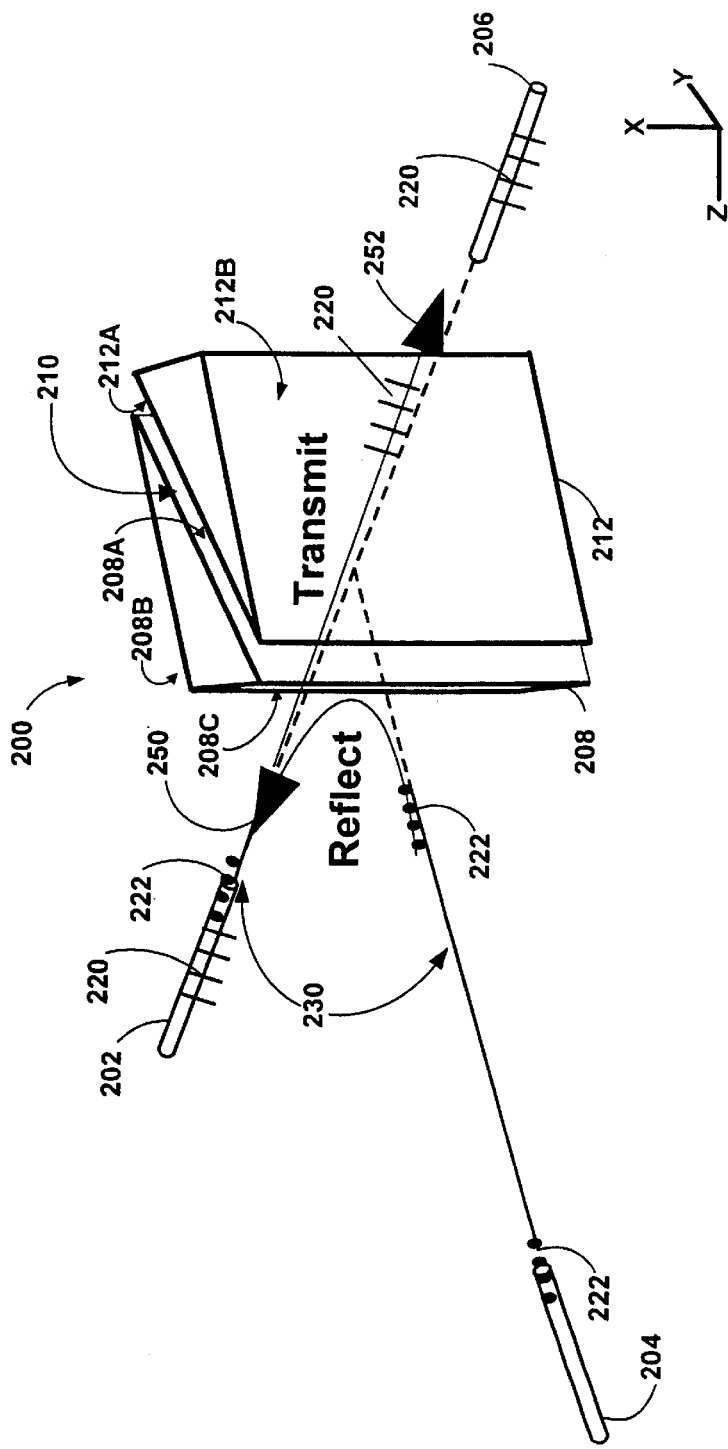
FIG. 2 shows an isometric view of a Prior Art prism and air gap functioning as an optical circulator by respectively transmitting and reflecting orthogonally polarized light beams.

An apparatus for optically circulating light is disclosed. An optical prism circulates orthogonally polarized beams along a generally longitudinal optical path. The orthogonally polarized beams are differentially bent as they are transmitted through a center portion of the wedge face of the prism. The net differential bending between the two orthogonally polarized beams is determined by the wedge angle of the prism, the index of refraction of each principal axis and the difference of the two principal indices.

In an embodiment of the invention the prism is sandwiched between lenses with each lens including collinear longitudinal optic axis which intersect the center portion of the wedge face. The focal point of each lens is proximate the center portion of the wedge face. Each lens serves to bend incoming beams to paths which intersect the focal point on the center portion of the wedge face and to collimate those beams. Each lens bends outgoing light emanating from the center portion to a path parallel to a longitudinal axis and focusses that light on a port. Whereas the prism is a polarization sensitive device, the lenses are polarization insensitive, bending light beams by an amount proportionate to their radial displacement from a longitudinal axis to intersect the center portion of the wedge face. The lenses also eliminate beam spreading by collimating light. Additionally by sharing a single lense between a plurality of ports multiple port embodiments of the circulator can be constructed. The circulator can accommodate these additional ports without any alteration of or addition to the components of the device. These three or more port embodiments of the inventive circulators may have a reduced lens count and a much reduced optical footprint when compared with prior art devices. In other words, multiple port (>4) circulator embodiments of the present invention may have the same or similar footprint as a three port circulator. By comparison, conventional optical circulators have an arrangement wherein each optical port has its own individual imaging element, resulting in a much bigger footprint/form factor.

Another advantage of the inventive optical circulators accrues because of the inventive circulator's symmetrical crystal layout. The inventive circulator's symmetrical crystal layout provides a symmetric beam path for two rays derived from a light beam emanating from a port, leading to much reduced, or even substantially eliminated, polarization mode dispersion.

In another aspect of the invention, only one lens is used on each side of the circulator, leading to fewer optical elements and a smaller footprint. In another aspect of the invention, thermally expanded core (TEC) fibers can be used to reduce alignment sensitivity.

In another aspect of the invention, an optical signal may be circulated by passing it through an optical pathway wherein the optical pathway comprises at least one circulator according to the invention. In another aspect of the invention, the inventive optical circulators may be used in telecommunications systems and in WDM's, EDFA's, add-drop multiplexers, dispersion compensators and OTDR's. These and other advantages of the inventive optical circulators are elaborated in the specific embodiments now described.

Figure 3:
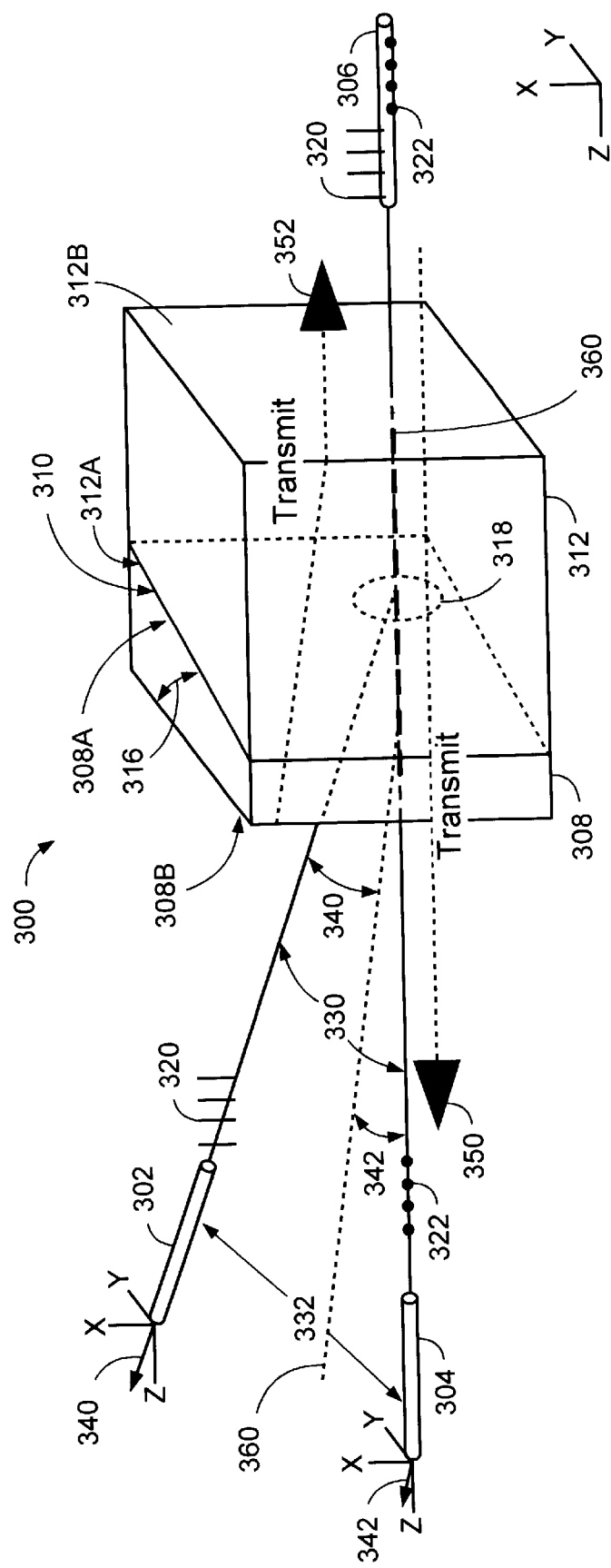
FIG. 3 shows an isometric view of a prism functioning as an optical circulator by transmitting at divergent paths orthogonally polarized light beams according to an embodiment of the current invention.

FIG. 3 shows an isometric view of a beam angle turner 300 functioning as an optical circulator according to an embodiment of the current invention. Orthogonally polarized beams 350–352 are differentially bent as they are transmitted through a center portion 318 of the center plane 310 of the prism pair 308, 312. The bending is polarization dependent.

The beam angle turner 300 functions as an optical circulator by transmitting at divergent paths orthogonally polarized light beams 350–352 according to an embodiment of the current invention. The optical circulator includes a first optical port 302, a third optical port 304, a second optical port 306, and beam angle turner 300. Beam angle turner includes birefringent wedges, i.e. prisms, 308 and 312. Each birefringent wedge may be fabricated from an anisotropic material with an optical axis. Each wedge includes opposing interior and exterior faces at an angle 316 one to another. Wedge 308 includes exterior face 308B and interior face 308A. Wedge 312 includes exterior face 312B and interior face 312A.

Preferable beam angle turners according to the invention may be based on Snell's law of refraction. Polarization sensitive angle turning is achieved by having a beam hit a birefringent crystal center plane at an acute angle as compared with a normal incidence angle in the case of birefringent walk-off crystals. Beams with different polarization vectors may experience different angles of refraction because of the difference in index of refraction in beam angle turner birefringent crystals. Further, the Poynting vector S and propagation vector K of either beam are substantially collinear with respect to one another. In alternate embodiments of the invention the beam angle turner comprises a Wollaston, Rochon, or modified Wollaston or Rochon prism, a Senarmont prism or other polarization dependent angle turning optical elements. These prisms produce separate beam pathways by refractive separation of a beams transmitted through the prism at polarization vector dependent angles. Conventional polarization beam splitter cubes by contrast, reflect one polarization state and transmits the other, orthogonally polarized, ray. By contrast as well, birefringent crystal spatially separate beams, through walk-off, i.e., the beams exit the crystal normal to the surface, and parallel to one another.

The various components of the optical circulator are distributed along the longitudinal axis 360 from a proximal to a distal end. The longitudinal axis is parallel to the "Z" axis referenced in the figures. The longitudinal axis of the device is normal to opposing exterior faces 308B, 312B of prisms 308, 312. First optical port 302, and third optical port 304 are located at a proximal end, and second optical port 306 is located at a distal end of the optical circulator. In the embodiment shown port 306 is collinear with the longitudinal axis while ports 302–304 are positioned at respectively angles 340–342 with respect to the longitudinal axis. The opposing interior faces 308A, 312A of the prism pair mate to form an optically coupled center plane 310 at an angle 316 to the longitudinal axis of the device An air gap is not required between the opposing interior faces 308A, 312A, because the beam bending occurs during beam transmission through the optically coupled center plane 310, rather than by transmission and reflection as is the case in prior art beam benders. In preferable embodiments, the first, second, and third optical ports may comprise integrated optical circuits or optical fibers or TEC fibers.

In operation, a beam 352 with polarization vector 320 emanates from first optical port 302 and enters beam angle turner through face 308B at a slight angle to the longitudinal axis. The beam is targeted toward the center portion 318 of the center plane 310. The beam is transmitted through the center portion and is bent toward the longitudinal axis of the circulator. At all times during the bending the Poynting and propagation vectors of the beam are collinear. The primary bending of the light passing through beam angle turner 300 occurs at interface 310. The beam propagation direction depending upon the beam polarization orientation and traveling direction. The beam then passes through the second prism 312 where any distortions of the beam shape brought about in the first prism 308 are compensated. The beam 352 then exits the beam angle turner and passes to the second optical port 306. The polarization vector 322 of beam 350 is orthogonal the polarization vector 320 of beam 352. Thus they are differentially bent in the circulator. Beam 350 with polarization vector 322 emanates from second optical port 306 and enters beam angle turner through face 312B collinear with the longitudinal axis 360. The beam is targeted toward the center portion 318 of the center plane 310. The beam is transmitted through the center portion and may be bent away from the longitudinal axis of the circulator. At all times points on the propagation path the Poynting and propagation vectors of the beam are collinear. The beam then passes through the second prism 308 where distortions of the beam shape brought about in the first prism 312 are compensated. The beam 350 then exits the beam angle turner and passes to the third optical port 304. In an alternate embodiment of the invention the beam bender comprises a single prism, e.g. 308, rather than a prism pair.

Because beams 350–352 have orthogonal polarization vectors the light entering first optical port 302 will travel along a different optical path towards third optical port 304. This creates optical circulation. Beams 350–352 diverge one from another at a divergence angle 330 that may be on the order of 1–15 degrees. This angle and the distance of the ports 302–304 from the center portion 318 determines the spacing of the ports 332, and the rectangular form factor of the circulator.

Figure 4:
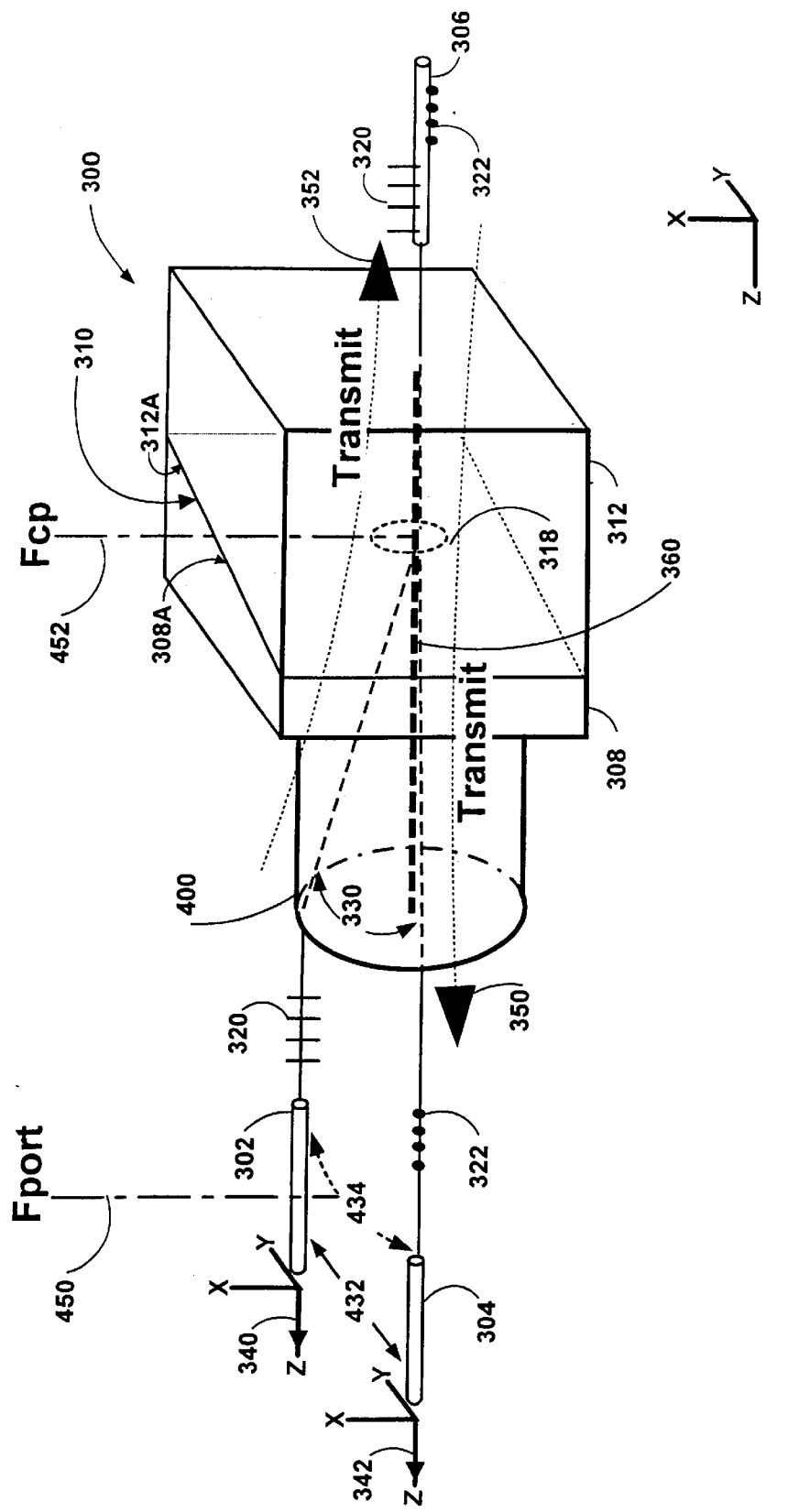
FIG. 4 shows an isometric view of an alternate embodiment of the optical circulator of FIG. 3 with an optical element for focusing and collimating light beams.

FIG. 4 shows an isometric view of an alternate embodiment of the optical circulator of FIG. 3 with an imaging element 400 for bending, focusing and collimating light beams 350–352. The lens is centered along the longitudinal axis 360. In the embodiment shown the lens has a graded index of refraction (GRIN). The focal planes 450–452 of the lens are respectively proximate the center portion 318 of the center plane 310 and at the focal arc 434 which includes both ports 302–304. The lens will bend incoming light 352 from port 302 to intersect the focal point 452 at the center plane of the center plane 310 and collimates that beam. As to an outgoing beam, e.g. beam 350 emanating from center portion 318, the lens bends the beam to be parallel to the longitudinal axis 360 and focusses the beam on port 304. Whereas the prism is a polarization sensitive device, the lenses are polarization insensitive, bending light beams by an amount proportionate to their radial displacement from the longitudinal axis to intersect the center portion of the wedge face. Although the divergence angle 330 of beams 350–352 is identical to that shown in FIG. 3, the separation distance 432 of ports 302–304 is significantly less than the spacing of the ports 302–304 shown in FIG. 3. This reduction in port spacing is a result of the bending and collimation of beams 350–352 by the imaging element 400. Additionally, because beams 350–352 are parallel to each other and to the longitudinal axis 360, ports 302–304 are also parallel to one another and to the longitudinal axis, thus simplifying their alignment. No complex angulation of ports is required to target their beams on the center portion. Instead a imaging element 400 performs this function for both beams. Because each beam is collimated and focussed the rectangular form factor of the optical circulator is reduced from that possible without the lens because of the reduction of the distance 432 between ports brought about by the lens. In an alternate embodiment of the invention an additional lens may be positioned between port 306 and the beam bender 308,312 to focus beam 352 on port 306.

Prior art circulators position an individual lens with a diameter of approximately 1.800 mm at the end of each optic fiber which itself is approximately 0.125 mm in diameter. The lenses collimate the beams from each fiber. Minimum port spacing is determined by the diameter of each lens rather than the diameter of the optic fiber. By contrast, in an embodiment of the current invention shown in FIG. 4, two or more ports, e.g. 302–304 share a single lens. Thus each port no longer requires an individual lens and the ports may be located closer to one another.

FIGS. 5A–D, 6A–D show alternate embodiments, i.e. modified Wollaston and Rochon prisms, of the optical circulator of FIG. 3. Conventional Wollaston prisms are formed by two birefringent wedges. In such prisms, the optical axes of each birefringent wedge are substantially perpendicular to one another and one of the optical axes is perpendicular to the direction of wedge interface. Conventional Wollaston and Rochon prisms are discussed further in Hecht, Optics 292 & 329 (1987) (2d. ed. Addison-Wesley). The modified Rochon or Wollaston prism differs from a conventional Rochon or Wollaston prism in the orientation of the optical axes of its wedges. In a modified Rochon prism, the optical axis of one of the wedges is oriented normal to the first interface, which is the same as in a conventional Rochon prism. However, the optical axis in the other wedge is oriented 45 degrees in the second interface (the second interface being parallel to the first interface and at the opposite end of the modified Rochon prism) with respect to the optical axis orientation the wedge would possess in a conventional Rochon prism. Similarly, in a modified Wollaston prism, the optical axis of each of its birefringent wedges are oriented perpendicularly to each other and 45 degrees in a plane that is normal to the normal incidence direction with respect to the optical axis in a conventional Wollaston prism.

Figure 5A:
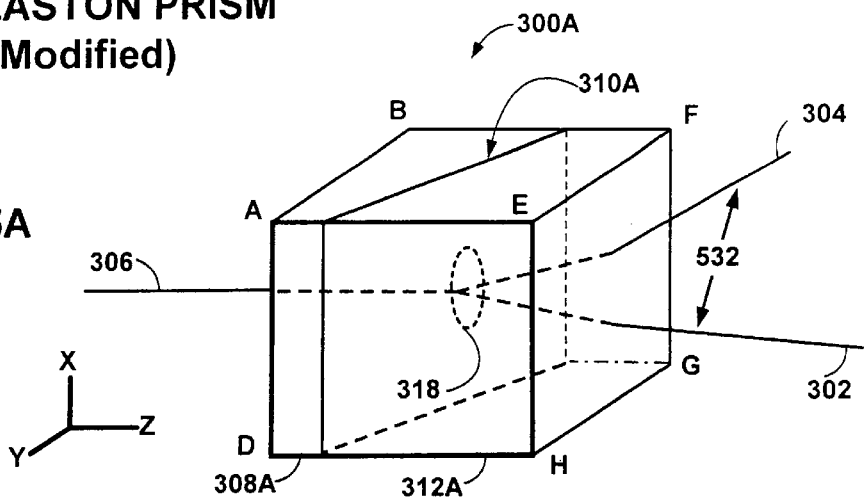
Figure 5B:
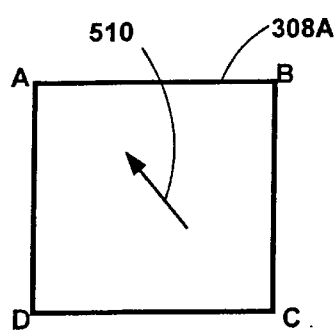
Figure 5C:
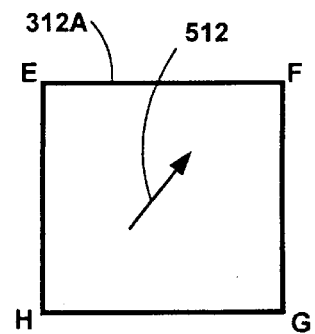

FIGS. 5A–D show a modified Wollaston prism 300A, having birefringent wedges 308, 312. The optic axes of each birefringent wedge 308, 312 are perpendicular to one another. However, as shown in FIGS. 5B–C the optic axis of each of the wedges has been rotated 45 degrees with respect to that of a conventional Wollaston prism. FIGS. 5B–C show two cross sections through modified Wollaston prism 300A, labeled as ABCD and EFGH. The optical axis 510 of birefringent wedge 308A and the optical axis 512 of birefringent wedge 312A are shown, as orthogonal diagonals respectively, CA and HF, of each wedge. In conventional Wollaston prisms, the optical axis of birefringent wedge 308A would be parallel to AD and perpendicular to the optical axis of birefringent wedge 312A which would be parallel to EF.

Figure 5D:
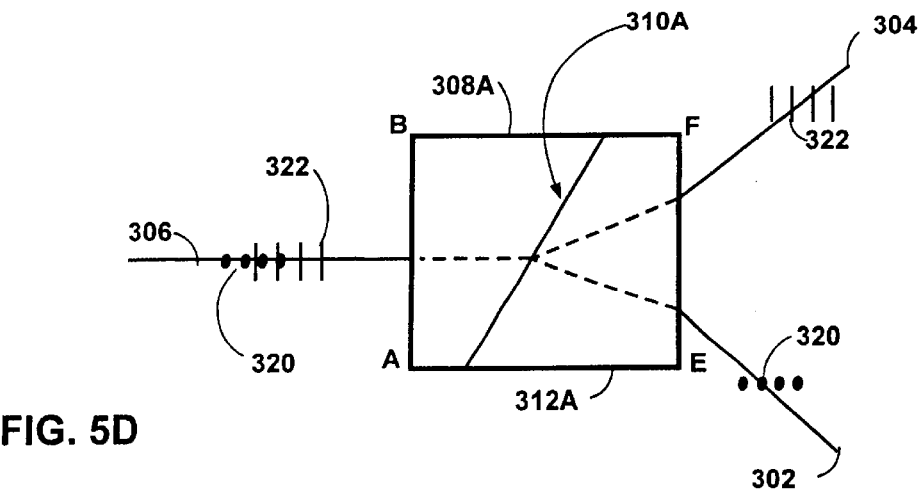

As shown in FIG. 5D, a light beam from port 302 with a polarization vector 320 is shown entering the modified Wollaston prism through wedge 312A, bending through the center portion 318 of the center plane 310A and exiting prism 308A on a path toward port 306. A light beam from port 306 with a polarization vector 322 is shown entering the modified Wollaston prism normal to the face ABCD of wedge 308A. Polarization vector 320 is oriented along BD perpendicular to the optic axis 510 of wedge 308A and parallel to the optic axis 512 of wedge 312A. Polarization vector 322 is oriented along HF parallel to the optic axis 512 of wedge 312A and perpendicular to the optic axis 510 of wedge 308A.

As the beam from port 306 enters the prism normal to face ABCD no beam bending occurs. That beam propagates through birefringent wedge 308A and arrive at the center plane 310A at an acute incidence angle, normally the wedge angle. The beam bends through the center portion 318 of the center plane 310A and exits prism 312A on a path toward port 304. The beam from port 302 enters the prism at an angle to face EFGH. Beam bending occurs as the beam propagates through wedge 312A to center plane 310A at which further bending occurs orienting the beam toward port 306. Because the indices of refraction of the orthogonally polarized 320–322 beams are different, according to Snell's law of refraction, polarization sensitive angle turning results at the center portion 318 of center plane 310A. Additional angle turning and beam separation will occur as the beams exit the beam bender. The polarization sensitive beam bending and the distance of ports 302–304 from the beam bender determines the separation 532 between ports. During this entire process, the Poynting vector S and the propagation vector K are substantially collinear, with the walk-off angle between S and K being preferably less than or approximately equal to ±1°.

FIGS. 6A–D show a modified Rochon prism. Like the Wollaston prism, the Rochon prism is also formed by two birefringent wedges. In a conventional Rochon prism, the optic axis of each birefringent wedge are perpendicular to one another, and one of the optic axes is substantially parallel to the propagation direction of light. In the modified Rochon prism as shown in FIG. 6B the optical axis 610 of wedge 308B is along the direction of the light beam from port 306, and normal to cross-section ABCD just as in a conventional Rochon prism. FIG. 6C shows the optical axis 612 of wedge 312B which is oriented on the diagonal HF of cross-section EFGH. The optical axis 612 of birefringent wedge 312B is perpendicular to optical axis 610 in the wedge 308B. In a conventional Rochon prism, optical axis 612 would be parallel to EH.

In a Rochon prism beams with orthogonal polarization vectors pass through one wedge, e.g., wedge 308B, on a path collinear with the optic axis of that wedge. The index of refraction with respect to each beam is the same since the propagation direction is along the optic axis. At the center portion 318 of the center plane 310B, according to Snell's law of refraction, the orthogonally polarized 320–322 beams will exhibit polarization sensitive angle. Additional angle turning and beam separation will occur as the beams exit the beam bender. The polarization sensitive beam bending and the distance of ports 302–304 from the beam bender determines the separation 632 between ports. During this entire process, the Poynting vector S and the propagation vector K are substantially collinear, with the walk-off angle between S and K being preferably less than or approximately equal to ±1°.

An advantage of using such modified prisms as beam angle turners according to the invention is that the use of an additional waveplate may be avoided, because the polarization vector of the incoming light beam falls into either orthogonal or parallel alignment with the optic axis of the modified prism. Additional waveplates increases system complexity and leads to narrower operating wavelength bandwidth.

Figure 7:
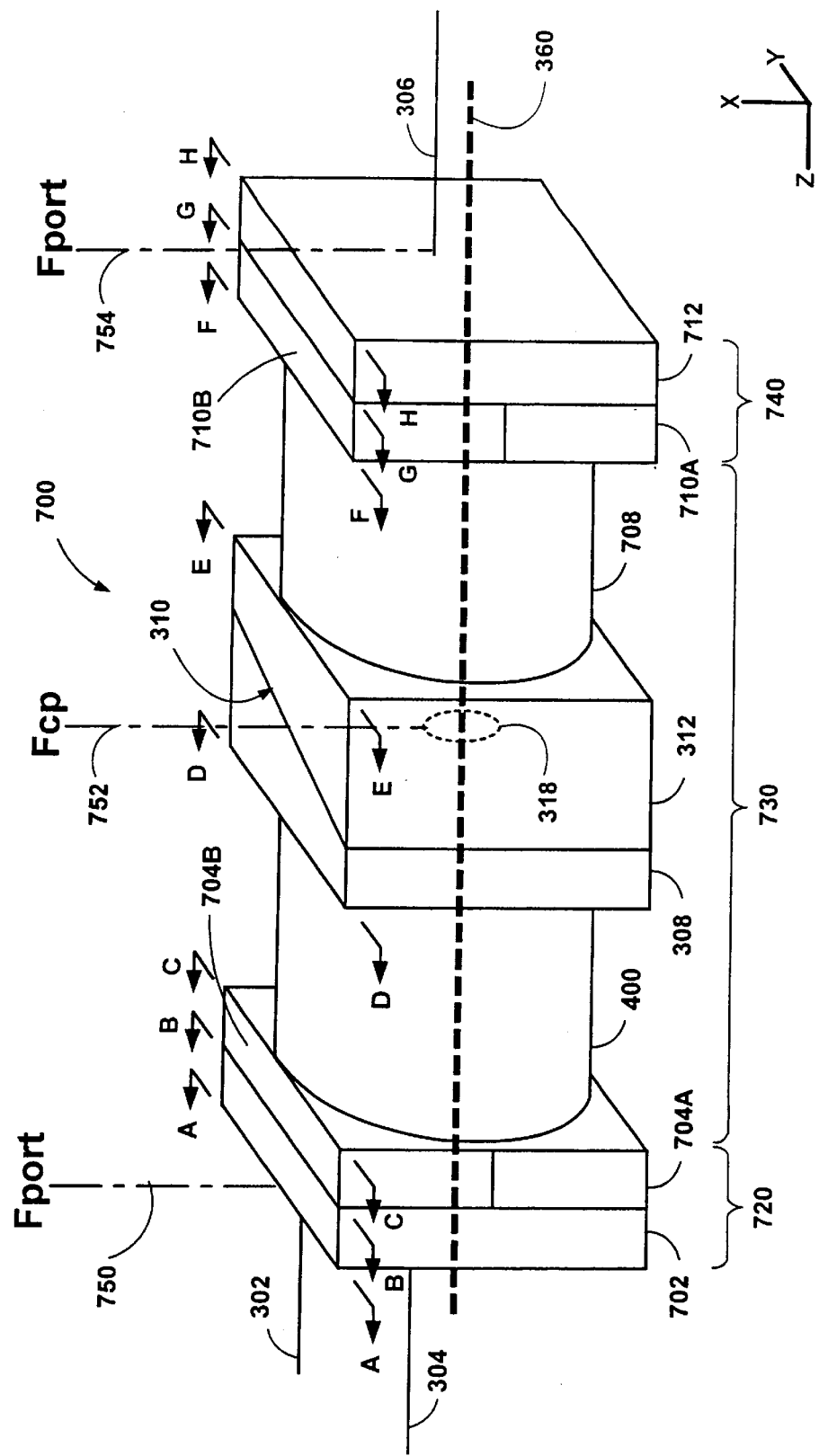
FIG. 7 shows an isometric view of an alternate embodiment of the optical circulator of the current invention including graded index of refraction lens elements and non-reciprocal rotators.

FIG. 7 shows a side isometric view of an embodiment of an polarization insensitive optical circulator according to the invention. The addition of end portions with beam displacer combiners and non-reciprocal rotators provides for polarization of normal light beams that varies depending on the propagation direction of the incoming light beam. This allows circulators to be built which circulate normal light with radom polarization orientation and arbitrary degrees of polarization. Optical circulator 700 includes: first optical port 302, third optical port 304, second optical port 306, first end portion 720, center portion 730, and second end portion 740. First end portion 720 includes first beam displacer/ combiner 702 and first nonreciprocal rotators 704A–B. Center portion 730 includes first imaging element 400, beam angle turner 308, 312, and second imaging element 708. Second end portion 740 includes second nonreciprocal rotators 710A–B, and second beam displacer/combiner 712.

The components of the optical circulator 700 are laid out along a longitudinal axis 360. First end portion 720 is optically coupled distally to the first and third optical ports, and is located in an opposing relationship to second end portion 740. First beam displacer/combiner 702 is optically coupled distally to the first and third optical ports 302 and 304. In a preferable embodiment, first beam displacer/combiner 702 is a birefringent crystal. In a more preferable embodiment, first beam displacer/combiner 702 comprises Yttrium Orthovanadate, calcite, rutile or a-BBO (barium borate). First nonreciprocal rotators 704A–B comprise nonreciprocal Faraday polarization rotators and are optically coupled distally from first beam displacer/combiner 702. In a preferable embodiment, first nonreciprocal rotators 704A–B comprise yttrium-iron-garnet (YIG), or Bi-added thick film crystals. The Bi-added thick film crystals preferably comprise a combination of $(BiTb)_3(FeGa)_5O_{12}$, $(YbTbBi)_3Fe_5O_{12}$ and $(GdBi)_3(FeAlGa)_5O_{12}$, or of YIG and $Y_{3-x}Bi_xFe_5O_{12}$.

Optically coupled distally to first end portion 720 is center portion 730. Included in center portion 730 is imaging element 400. Imaging element 400 is optically coupled distally to first nonreciprocal rotators 704A–B. Beam angle turner 308, 312 is optically coupled to imaging element 400 distally along the horizontal axis. Beam angle turner 308, 312 is shown as a modified Wollaston prism, as described above. Imaging element 708 is optically coupled distally to beam angle turner 308, 312. The embodiment in FIG. 7 does not require reciprocal rotators because the optic axis of the modified Wollaston prism are aligned either orthogonal or parallel to the polarization vectors of the incoming light beams.

Optically coupled distally to center portion 730, second nonreciprocal rotators 710A–B are included in center portion 730, and are optically coupled to beam angle turner 308, 312. Second nonreciprocal rotators 710A–B comprise a nonreciprocal Faraday polarization rotator. In a preferable embodiment, the second nonreciprocal rotators comprise yttrium-iron-garnet (YIG), or Bi-added thick film crystals. The Bi-added thick film crystals preferably comprise a combination of $(YbTbBi)_3Fe_5O_{12}$ and $(GdBi)_3(FeAlGa)_5O_{12}$, or of YIG and $Y_{3-x}Bi_xFe_5O_{12}$. Second beam displacer/combiner 712 is optically coupled distally from second nonreciprocal rotators 710A–B and proximally from second optical port 306.

Each of the imaging elements 400, 708 has a common focal point 752 at the center portion 318 of the center plane 310 of the beam angle turner 308, 312. The longitudinal axis 360 passes through the center portion and intersects the center plane at an acute angle. Each imaging element also has a focal point at a corresponding end of the optical circulator. Imaging element 400 has a focal point 750 at the focal plane which includes ports 302–304. Imaging element 708 has a focal point at the focal plane 754 which includes port 306.

In operation, unpolarized or randomly polarized light from first optical port 302 enters first beam displacer/combiner 702, which acts as a polarization sensitive beam displacement plate. The unpolarized light is decomposed into two rays with orthogonal polarization vectors. Within first beam displacer/combiner 702, the first ray is an ordinary light ray (O-ray) and the other ray is an extraordinary light ray (E-ray). The E-ray walks off vertically from the O-ray through first beam displacer/combiner 702, with the result that there is a top and bottom ray, relative to the "X" axis.

The rays then enter first nonreciprocal rotators 704A–B. In a preferable embodiment, first nonreciprocal rotator 704A rotates by 45 degrees clockwise a ray of light passing through it from first optical port 302 to second optical port 306. In another preferable embodiment, first nonreciprocal rotator 704B rotates by 45 degrees counterclockwise a ray of light passing through it from first optical port 302 to second optical port 306. In another preferred embodiment, the relative directions of rotation imparted by first nonreciprocal rotator 704A and second nonreciprocal rotator 710A, and by first nonreciprocal rotator 704B and second nonreciprocal rotator 710B, may be respectively reversed so that any light rays passing through the circulator in either propagation direction will experience both counterclockwise and clockwise rotation thus avoiding polarization mode dispersion (PMD).

Upon exiting first nonreciprocal rotators 704A–B, both rays have the same polarization orientation before entering first imaging element 400. Imaging element 400 bends distally propagating light from either port 302/304 to intersect center portion 318 and collimates those beams in the process. Additionally, the lens bends proximally propagating light emanating from the center portion to a path parallel to the longitudinal axis and focusses that light on a respective one of ports 302–304. Imaging element 708 performs a symmetrical function bending proximally propagating light from port 306 to intersect center portion 318 and collimates those beams in the process. Additionally, imaging element 708 bends distally propagating light emanating from the center portion to a path parallel to the longitudinal axis and focusses that light on port 306. In an embodiment of the invention the imaging elements 400, 708 may alternately comprise one or more collimating lenses and prisms in series to collimate and bend the light. The lenses may have uniform index of refraction or may be fabricated with a graded index of refraction. In the embodiment shown in FIG. 7 the lens are fabricated with graded indices of refraction, e.g. GRIN lenses.

Both distally propagating rays then enter beam angle turners 308, 312. Beam angle turners bend both rays in an amount proportionate to their polarization vector. The rays then exit the beam angle turner and transit through second imaging element 708. Second imaging element 708 serves to collimate the distally propagating rays.

The rays then enter second nonreciprocal rotators 710A–B. In a preferable embodiment, second nonreciprocal rotator 710A rotates by 45 degrees counterclockwise a polarized ray of light passing through it from first optical port 302 to second optical port 306. In another preferable embodiment, second nonreciprocal rotator 710B rotates by 45 degrees clockwise a polarized ray of light passing through it from first optical port 302 to second optical port 306. The rays then pass through second beam displacer/combiner 712, where the beams are recombined. The recombined light beam then passes through second optical port 306. Unpolarized light emanating from second optical port 306 will travel in the opposite direction. Second nonreciprocal rotators 710A–B will direct light along a different optical path towards third optical port 304. This creates optical circulation.

Figures 8A, 8B:
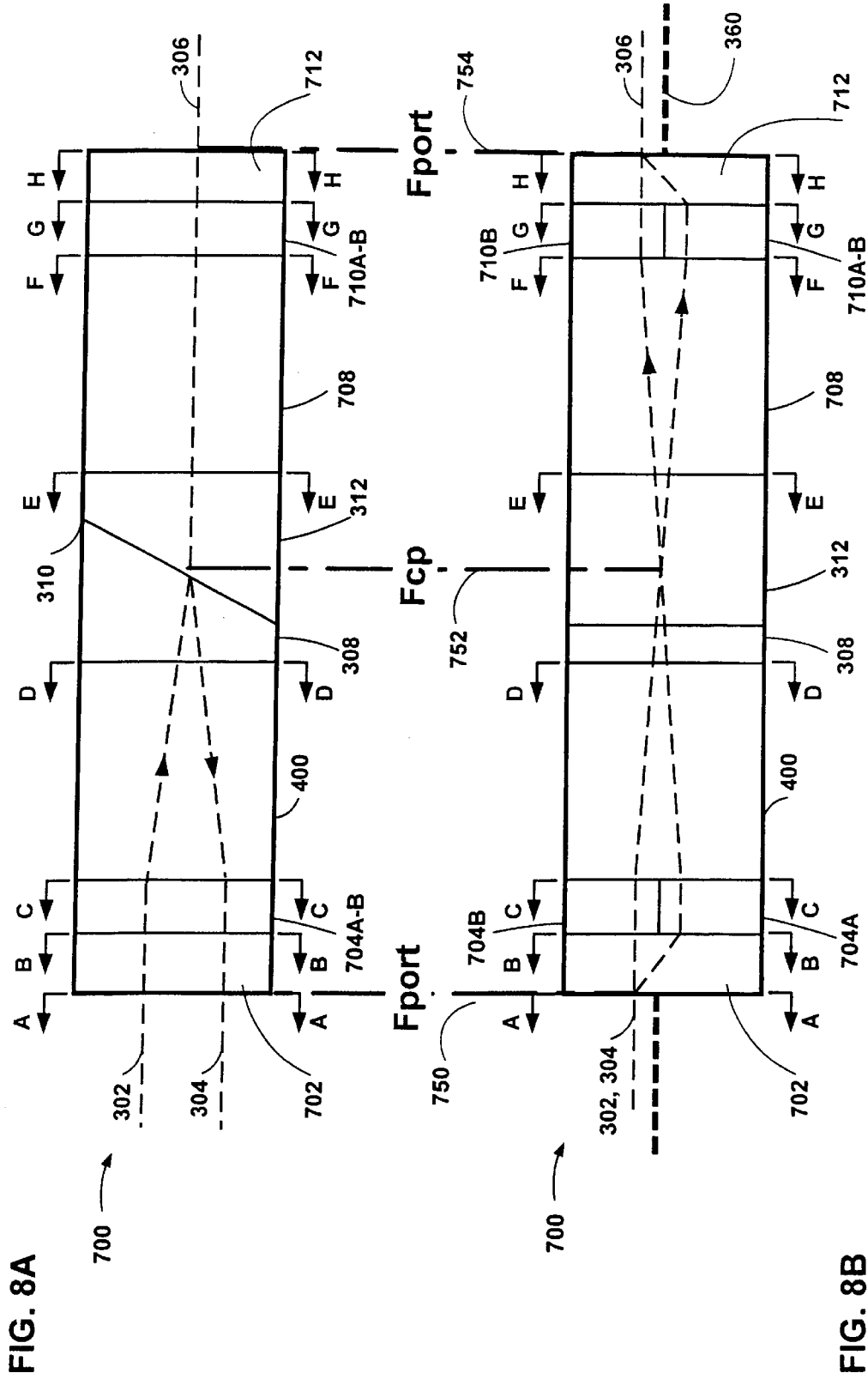
FIGS. 8A–B show a top and side views of the optical circulator of FIG. 7.

FIGS. 8A–B show top and side views of optical circulator 700. FIG. 8A shows a top view of optical circulator 700, together with an internal ray trace, showing directions of the light rays within the circulator. FIG. 8B shows a side view of optical circulator 700, together with an internal ray trace, showing directions of the light rays within the circulator. Optical circulator 700 as depicted in FIGS. 8A–B has the same components, structure and operation as optical circulator 700 as depicted in FIG. 7.

The operation of optical circulator 700 is illustrated in the cross sectional schematic representations shown in FIGS. 9A–B. FIG. 9A shows how a beam of normal light entering at first optical port 302 is split into rays with orthogonal polarization vectors so as to arrive at second optical port 306. The unpolarized beam is shown at cross section A—A, entering the first beam displacer/combiner 702. At cross-section B—B, upon exiting first beam displacer/combiner 702, a ray with a vertical polarization vector is shown as being walked off vertically from the top ray with a horizontal polarization vector. At cross-section C—C, upon exiting first nonreciprocal rotators 704A–B, the polarization of the top ray is shown as being rotated 45 degrees counter-clockwise while the bottom ray is shown as being rotated 45 degrees clockwise. At cross-section D—D, upon entering the beam angle turner, both of the rays are unchanged in polarization orientation, but have changed their spatial location. At cross-section E—E, upon exiting beam angle turner 308, 312 the propagation directions of the rays is changed from the directions that the rays possessed at cross-section D—D. At cross-section F—F, after passing through second imaging element 708, the rays have been spatially separated. At cross-section G—G, upon exiting second nonreciprocal rotators 710A–B, the polarization of the top ray is shown as being rotated 45 degrees clockwise while the bottom ray is shown as being rotated 45 degrees counter-clockwise. At cross-section H—H, upon exiting second beam displacer/combiner 712, the two rays are recombined to exit at second optical port 306.

FIG. 9B shows how a beam of light entering the circulator from the second optical port is manipulated so as to arrive at third optical port 304. Cross-section H—H shows the beam entering the second beam displacer/combiner 712. At cross-section G—G, a ray with a vertical polarization vector is shown as being walked off vertically downward from a top ray with a horizontal polarization vector, thus creating a top and bottom ray. At cross-section F—F, the polarization of the top ray is shown as being rotated 45 degrees clockwise while the bottom ray is shown as being rotated 45 degrees counter-clockwise. Both polarized rays traveling from second optical port 306 to third optical port 304 are now in the same polarization orientation. The rays are also perpendicular to the polarized rays traveling from first optical port 302 to second optical port 306. The orthogonal polarization orientation is due to the non-reciprocity of second nonreciprocal rotators 710A–B. At cross-section E—E, both of the rays are unchanged in polarization orientation but their propagation directions and spatial locations within the cross-section have been changed. Additionally, the beam path of the polarized rays traveling from second optical port 306 to third optical port 304 is different from the polarization of the rays traveling from first optical port 302 to second optical port 306 because the polarization orientations of the two sets of rays are perpendicular to each other as they travel through beam angle turner 308, 312. At cross-section D—D, upon exiting beam angle turner 308, 312, the propagation directions of the rays is changed from the directions that the rays possessed at cross-section D—D. At cross-section C—C, both of the rays are unchanged in polarization orientation but their propagation directions and spatial locations within the cross-section have been changed. At cross-section B—B, the polarization of the top ray is shown as being rotated 45 degrees clockwise while the bottom ray is shown as being rotated 45 degrees counter-clockwise. At cross-section A—A, the two rays are recombined to exit at third optical port 304.

As is evident in cross-sections A—A and C—C of FIGS. 9A–B, an effect of the components of the first end portion 720 and a second end portion 740 is to impart to light coming into the circulator a polarization vector which depends on the propagation direction of the beam or rays. Conversely, these same elements in the embodiment shown also serve to combine any rays generated internally within the circulator from a single incoming beam to form a single outgoing beam.

Figure 10:
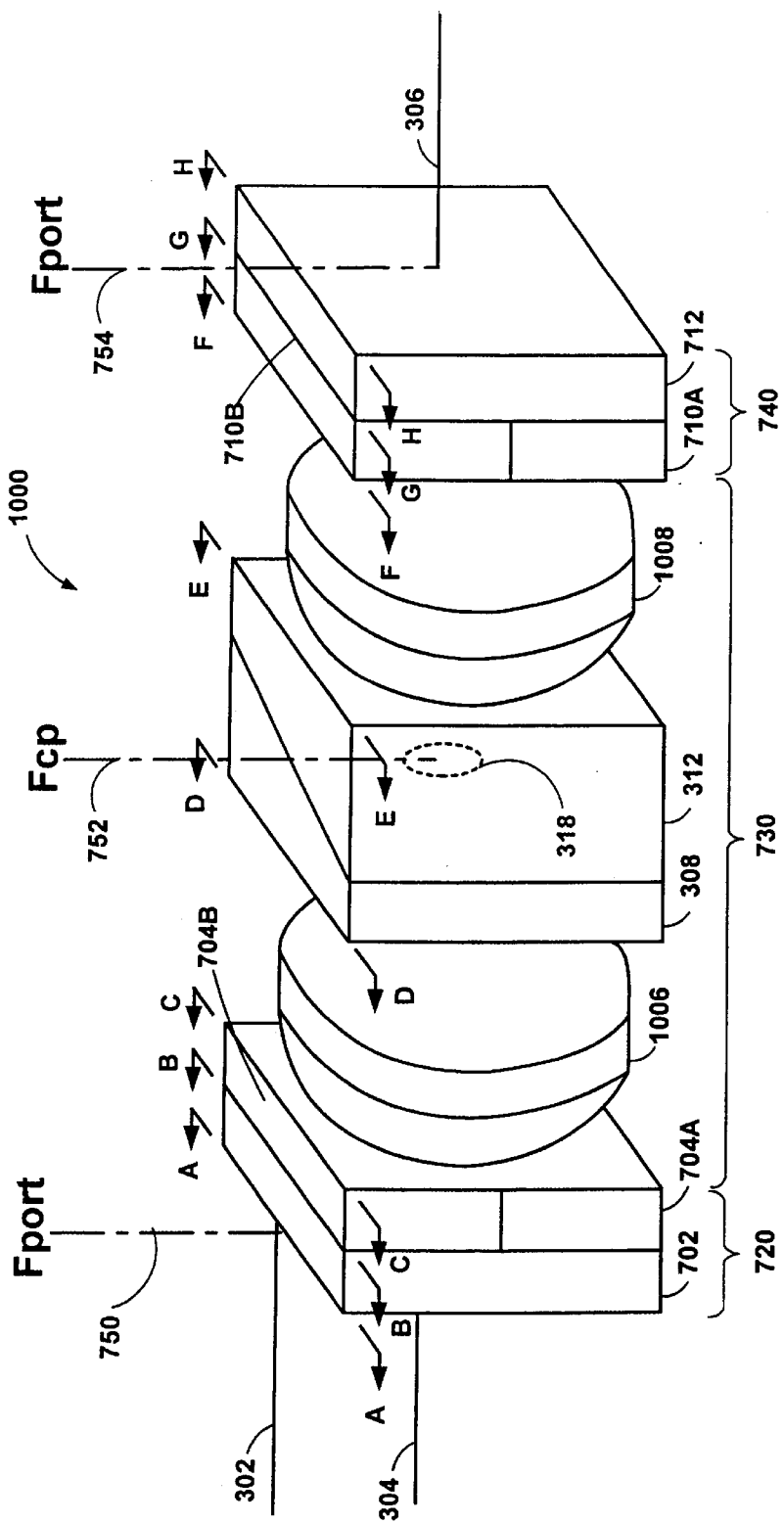
FIG. 10 shows an isometric view of an alternate embodiment of the optical circulator of the current invention including double convex lens elements and non-reciprocal rotators.

FIG. 10 shows a side isometric view of optical circulator 1000. Optical circulator 1000 has the same components, structure and operation as optical circulator 700 as depicted in FIG. 7 except with respect to first imaging element 1006 and second imaging element 1008. In optical circulator 1000, first imaging element 1006 and second imaging element 1008 are depicted as constant gradient, double convex lenses. This is in contrast to the circulator embodiment shown in FIG. 7, wherein the imaging elements were gradient index, or GRIN, lenses. In general, the first or second imaging elements may be, but are not limited to, double convex lenses, plano-convex lenses, aspherical lenses, or graded index of refraction (GRIN) lenses. Equivalent lens or optical element structures may also be substituted, as suggested above with the replacement of the GRIN lenses with collimating lenses and prisms in series.

FIGS. 11A–B show top and side isometric views of optical circulator 1000. FIG. 11A shows a top isometric view of optical circulator 1000, together with an internal ray trace, showing directions of the light rays within the circulator. FIG. 11B shows a side isometric view of optical circulator 1000, together with an internal ray trace, showing directions of the light rays within the circulator. Optical circulator 1000 as depicted in FIGS. 11 A–B has the same components, structure and operation as optical circulator 1000 as depicted in FIG. 10.

The operation of optical circulator 1000 is illustrated in the cross sectional schematic representations shown in FIGS. 12A–B. FIG. 12A shows how the light beam entering at first optical port 302 is manipulated so as to arrive at second optical port 306. FIG. 12B shows how the beam of unpolarized light entering at second optical port 306 is manipulated so as to arrive at third optical port 304. In other respects, the operational description of FIGS. 12A–B is identical to the operational description of FIGS. 9A–B.

Figure 13:
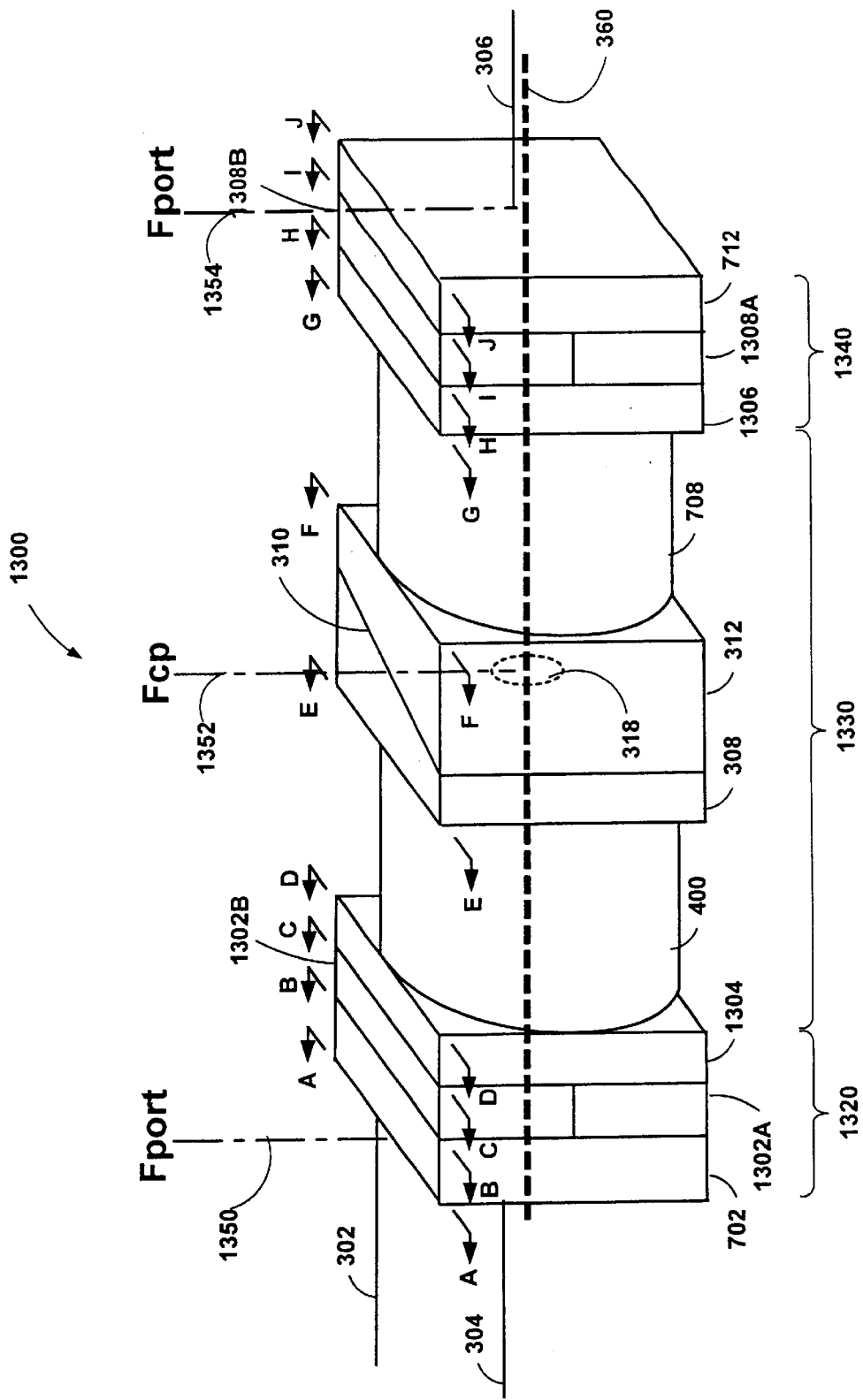
FIG. 13 shows an isometric view of an alternate embodiment of the optical circulator of the current invention including graded index of refraction lens elements and non-reciprocal and reciprocal rotators.

FIG. 13 shows an isometric view of an alternate embodiment of the optical circulator of the current invention including graded index of refraction lens elements and non-reciprocal and reciprocal rotators. In comparison with the embodiment shown in FIG. 7, optical circulator 1300 uses only one Faraday non-reciprocal rotator on each side of the circulator instead of a split pair. Shown is optical circulator 1300, including first optical port 302, third optical port 304, second optical port 306, first end portion 1320, center portion 1330, and second end portion 1340. First end portion 1320 includes first beam displacer/combiner 702, first reciprocal rotators 1302A–B, and first nonreciprocal rotator 1304. Center portion 1330 includes first imaging element 400, beam angle turner 308, 312 (which is a conventional Wollaston prism), and second imaging element 708. Second end portion 1340 includes second nonreciprocal rotator 1306, second reciprocal rotators 1308A–B, and second beam displacer/combiner 712. First end portion 720 is optically coupled distally to the first and third optical ports, and is located in an opposing relationship to second end portion 1340. First beam displacer/combiner 702 is optically coupled distally to the first and third optical ports 302 and 304. In a preferable embodiment, first beam displacer/combiner 702 is a birefringent crystal. In a more preferable embodiment, first beam displacer/combiner 702 comprises Yttrium Orthovanadate, calcite, rutile or a-BBO (barium borate). First reciprocal rotators 1302A–B comprise reciprocal polarization rotators, such as half-wave plates, and are optically coupled distally from first beam displacer/combiner 702. Reciprocal rotators may be made from crystal quartz, calcite, or other conventional birefringent materials. First nonreciprocal rotator 1304 is optically coupled distally to first reciprocal rotators 1302A–B, and can be made from materials including, but not limited to, the nonreciprocal rotating materials discussed above.

Optically coupled distally to first end portion 1320 is center portion 1330. Included in center portion 1330 is first imaging element 400. First imaging element 400 is optically coupled distally to first nonreciprocal rotator 1304. Beam angle turner 308, 312 is optically coupled to first imaging element 400 distally along the horizontal axis. Shown as beam angle turner 308, 312 is a conventional Wollaston prism. This is different, for example, from the modified Wollaston prism shown in FIG. 7. In this embodiment, additional waveplates are used to rotate the polarization vectors of the incoming light beams into alignment with the optical axis of a conventional Wollaston prism. Second imaging element 708 is optically coupled distally to beam angle turner 308, 312. Optically coupled distally to center portion 1330 is second end portion 1340, including second nonreciprocal rotator 1306. Second nonreciprocal rotator 1306 is optically coupled to second imaging element 708. Second nonreciprocal rotators 710A–B comprise a nonreciprocal Faraday polarization rotator, and can be made from materials including, but not limited to, the nonreciprocal rotating materials discussed above. Optically coupled distally to second non-reciprocating rotator 1306 are second reciprocating rotators 1308A–B. Second beam displacer/combiner 712 is optically coupled distally from second reciprocal rotators 1308A–B and proximally from second optical port 306.

Each of the imaging elements 400, 708 has a common focal point 1352 at the center portion 318 of the center plane 310 of the beam angle turner 308, 312. The longitudinal axis 360 passes through the center portion and intersects the center plane at an acute angle. Each imaging element also has a focal point at a corresponding end of the optical circulator. Imaging element 400 has a focal point 1350 at the focal plane which includes ports 302–304. Imaging element 708 has a focal point 1354 at the focal plane which includes port 306.

In operation, unpolarized light or randomly polarized light from first optical port 302 enters first beam displacer/combiner 702, which acts as a polarization sensitive beam displacement plate. The unpolarized light is decomposed into two rays with orthogonal polarization vectors. Within first beam displacer/combiner 702, the first ray is an ordinary light ray (O-ray) and the other ray is an extraordinary light ray (E-ray). The E-ray walks off vertically from the O-ray through first beam displacer/combiner 702, with the result that there is a top and bottom ray. The rays then enter first reciprocal rotators 1302A–B. In a preferable embodiment, first reciprocal rotator 1302A rotates by 45 degrees clockwise a ray of light passing through it from first optical port 302 to second optical port 306. In another preferable embodiment, first reciprocal rotator 1302B rotates by 45 degrees counterclockwise a ray of light passing through it from first optical port 302 to second optical port 306. In another preferred embodiment, the relative directions of rotation imparted by first reciprocal rotator 1302A and second reciprocal rotator 1308A, and by first reciprocal rotator 1302B and second reciprocal rotator 1308B, may be respectively reversed. Upon exiting first reciprocal rotators 1302A–B, both rays have the same polarization orientation. In passing through first nonreciprocal rotator 1304, both rays are rotated by 45 degrees clockwise.

First imaging element 400 serves to bend distally propagating light to intersect center portion 318 and to collimate that light. Additionally, the first imaging element bends proximally propagating light to a path parallel to the longitudinal axis 360 and to focus that light on either of ports 302–304. The first imaging element may comprise one or more collimating lenses and prisms in series to collimate and bend the light. Both distally propagating rays enter the center portion of the beam angle turners 308, 312 where they are bent in a polarization dependent manner. The rays exit the beam angle turner where they may experience additional bending and transit through second imaging element 708. Second imaging element bends proximally propagating light to intersect center portion 318 and to collimate that light. Additionally, the second imaging element bends distally propagating light to a path parallel to the longitudinal axis 360 and focuses that light on port 306. The second imaging element may comprise one or more collimating lenses and prisms in series to collimate and bend the light.

The distally propagating rays then enter second nonreciprocal rotator 1306, and are rotated by 45 degrees clockwise. Following second nonreciprocal rotator 1306, the rays enter second reciprocal rotators 1308A–B. In a preferable embodiment, second reciprocal rotator 1308A rotates by 45 degrees clockwise a ray of light passing through it from first optical port 302 to second optical port 306. In another preferable embodiment, second reciprocal rotator 1308B rotates by 45 degrees counter-clockwise a ray of light passing through it from first optical port 302 to second optical port 306. The rays then pass through second beam displacer/combiner 712, where the beams are recombined. The recombined light beam then passes through second optical port 306. Unpolarized light entering second optical port 306 will travel in the opposite direction. Second nonreciprocal rotator 1306 will direct light along a different optical path towards third optical port 304. This creates optical circulation.

FIGS. 14A–B show top and side isometric views of optical circulator 1300. FIG. 14A shows a top isometric view of optical circulator 1300, together with an internal ray trace, showing directions of the light rays within the circulator. FIG. 14B shows a side isometric view of optical circulator 1300, together with an internal ray trace, showing directions of the light rays within the circulator.

The operation of optical circulator 1300 is illustrated in the cross sectional schematic representations shown in FIGS. 15A–B. FIG. 15A shows how a beam of light entering at first optical port 302 is manipulated so as to arrive at second optical port 306. Cross section A—A, shows the beam entering the first beam displacer/combiner 702. At cross-section B—B, upon exiting first beam displacer/combiner 702, a ray with a vertical polarization vector is shown as being walked off vertically downward from a top ray with a horizontal polarization vector, thus creating a top and bottom ray. At cross-section C—C, upon exiting first reciprocal rotators 1302A–B, the polarization of the top ray is shown as being rotated 45 degrees counter-clockwise while the bottom ray is shown as being rotated 45 degrees clockwise. At cross-section D—D, upon exiting first non-reciprocal rotator 1304, the polarization of both the rays is shown as being rotated by 45 degrees clockwise. At cross-section E—E, after exiting first imaging element 400, the rays exhibit the same polarization orientation, but their propagation direction and spatial location within the cross-section have changed. At cross-section F—F, upon exiting the beam angle turner, both of the rays are unchanged in polarization orientation, but have changed their spatial location to nearly overlap. At cross-section G—G, upon exiting second imaging element 708, the rays have been spatially separated. At cross-section H—H, upon exiting second nonreciprocal rotator 1306, the polarization of both the top and bottom rays have been rotated by 45 degrees clockwise. At cross-section I—I, the top ray is shown as being rotated 45 degrees counter-clockwise while the bottom ray is shown as being rotated 45 degrees clockwise. At cross-section J—J, upon exiting second beam displacer/combiner 712, the two rays are recombined to exit at second optical port 306.

FIG. 15B shows how the beam of light entering at second optical port 306 is manipulated so as to arrive at third optical port 304. Cross section J—J shows the beam entering the second beam displacer/combiner 712. At cross-section I—I, a ray with a vertical polarization vector is shown as being walked off vertically downward from a top ray with a horizontal polarization vector, thus creating a top and bottom ray. At cross-section H—H, the polarization vector of the top ray is shown as being rotated 45 degrees clockwise while the bottom ray is shown as being rotated 45 degrees counter-clockwise. Both polarized rays traveling from second optical port 306 to third optical port 304 are now in the same polarization orientation. At cross-section G—G, both of the rays are shown as being rotated by 45 degrees clockwise. At cross-section F—F, both of the rays are unchanged in polarization orientation but their propagation directions and spatial locations within the cross-section have been changed. Additionally, the beam path of the polarized rays traveling from second optical port 306 to third optical port 304 is different from that of the rays traveling from first optical port 302 to second optical port 306 because the polarization vectors of the two sets of rays are perpendicular to each other as they travel through beam angle turner 308, 312. At cross-section E—E, upon exiting beam angle turner 308, 312, the rays' polarization orientation remains the same, but the propagation directions of the rays is changed from the directions they possessed at cross-section F—F. At cross-section D—D, upon exiting first imaging element 400, both of the rays are unchanged in polarization orientation but their propagation directions and spatial locations within the cross-section have been changed. At cross-section C—C, the polarization of both the top and bottom rays is shown as being rotated by 45 degrees counter-clockwise. At cross-section B—B, the top ray is shown as being rotated 45 degrees counter-clockwise while the bottom ray is shown as being rotated 45 degrees clockwise. At cross-section A—A, the two rays are recombined to exit at third optical port.

FIG. 16 shows a side isometric view of optical circulator 1600 in a multiple port configuration. Optical circulator 1600 has the same components, structure and operation as optical circulator 700 as depicted in FIG. 7 except with respect to the optical ports. Optical circulator 1600 depicts fourth optical port 1602, fifth optical port 1604, and sixth optical port 1606. This is in contrast to the circulator embodiment shown in FIG. 7, wherein only three optical ports were depicted. Thus, it is possible to expand the invention from a three port device into a multiple port device simply by providing two arrays of fibers on each side with equal spacing between the optical ports in each array. The inter-array spacing is determined by the focal length of the imaging element and the amount of angle turning of the angle turner. Because of the collimating and focusing capability of the imaging elements multi-port embodiments can be implemented with a compact rectangular form factor. A low cost, compact, multi-port circulator, such as circulators according to the invention, is desirable in many applications where size and price are critical. Further, optical elements may be inserted between the optical ports to achieve desirable functions such as dispersion compensation, add/drop and wavelength multiplexing and demultiplexing.

In operation, optical circulator 1600 functions identically to optical circulator 700, except with respect to unpolarized light entering third optical port 304, fourth optical port 1602 and fifth optical port 1604. In optical circulator 1600, unpolarized light is permitted to enter into third optical port 304, and is received at fourth optical port 1602. Unpolarized light introduced at fourth optical port 1602 is received at fifth optical port 1604. Unpolarized light introduced at fifth optical port 1604 is received at sixth optical port 1606. In similar fashion, more optical ports may be added to inventive optical circulator 1600.

Figure 17A:
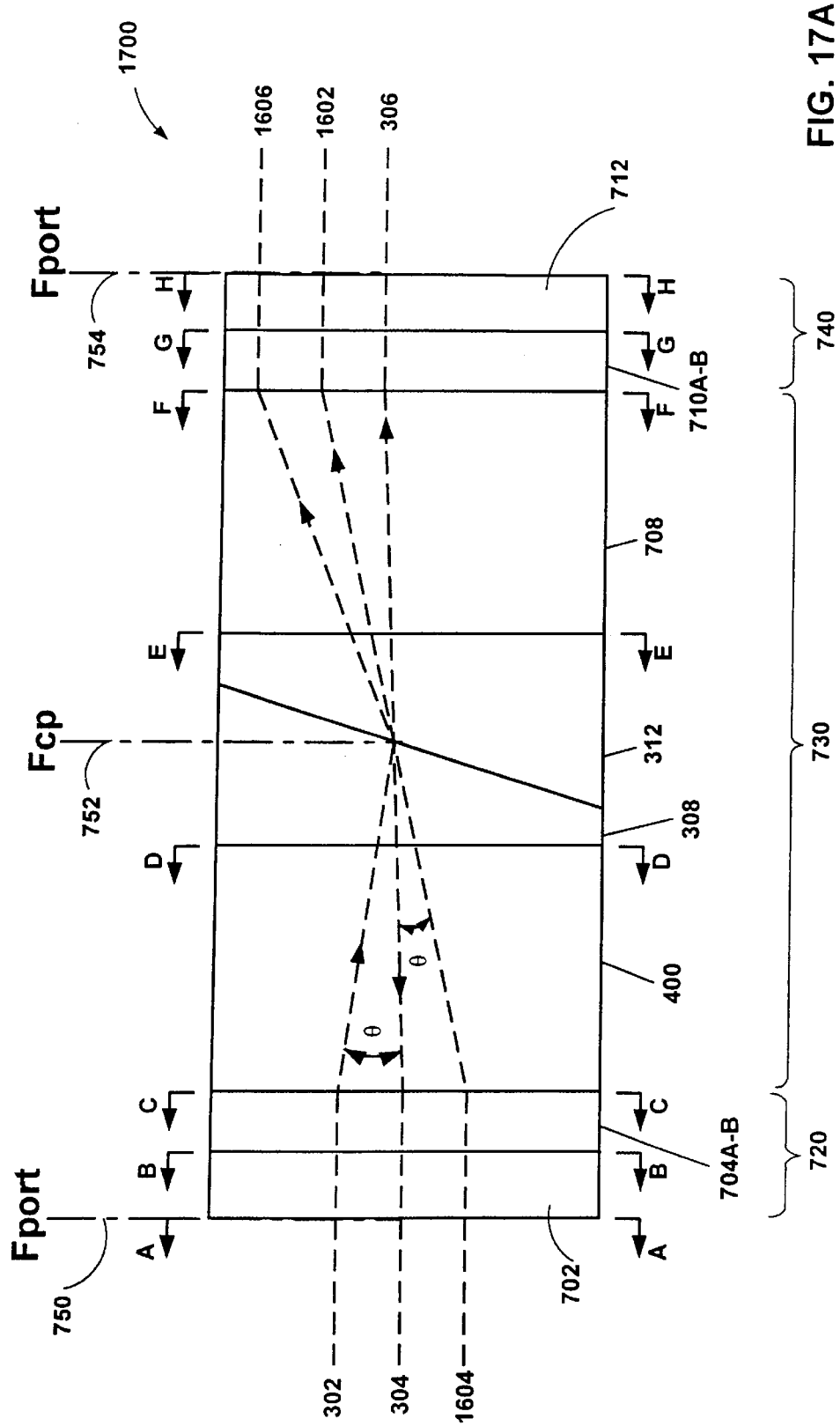
FIGS. 17A–B show top and side views of the optical circulator of FIG. 16.
Figure 17B:
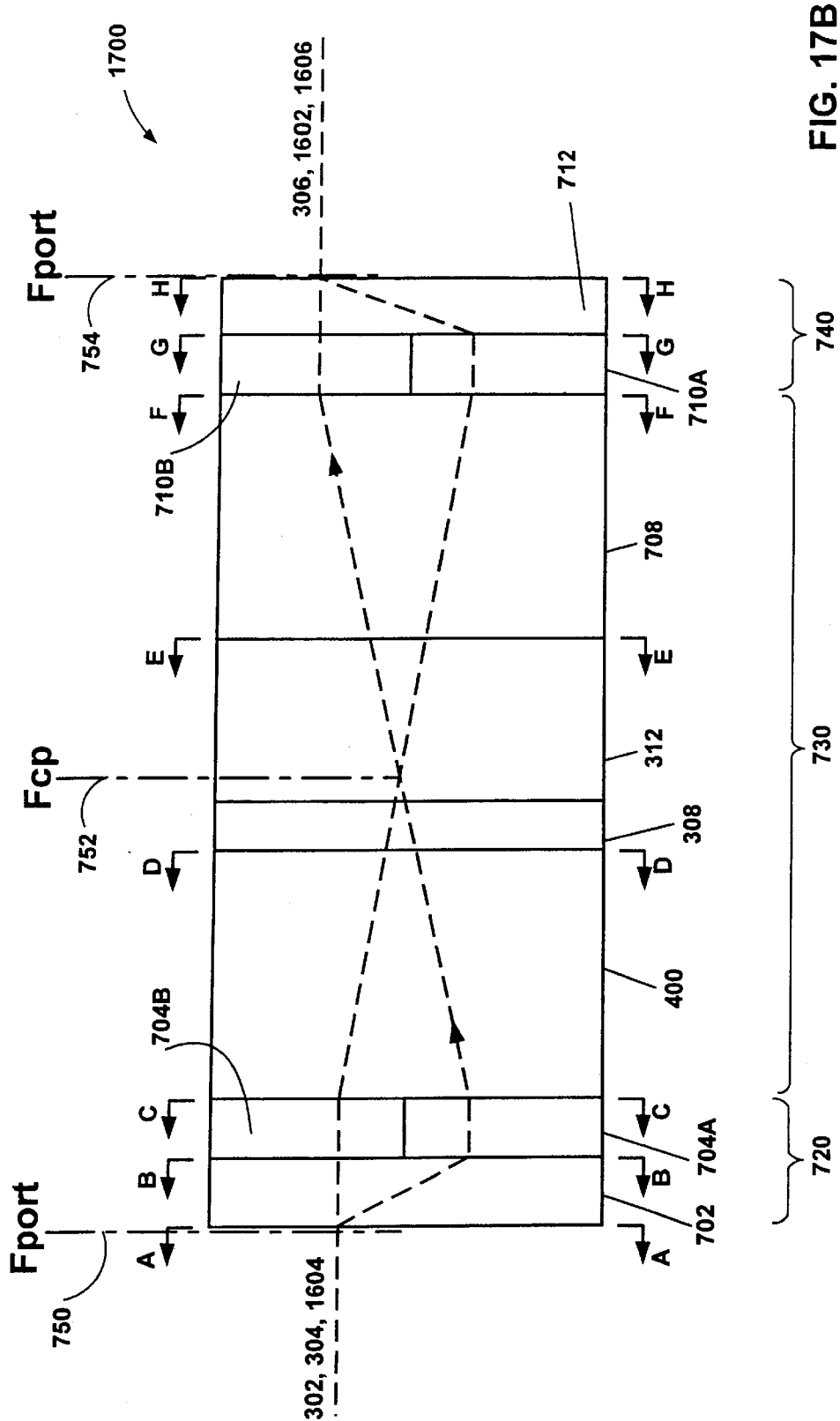

FIGS. 17A–B show top and side isometric views of optical circulator 1700. FIG. 17A shows a top isometric view of optical circulator 1700, together with an internal ray trace, showing directions of the light rays within the circulator. FIG. 17B shows a side isometric view of optical circulator 1700, together with an internal ray trace, showing directions of the light rays within the circulator. Optical circulator 1700 as depicted in FIGS. 17A–B has the same components, structure and operation as optical circulator 1600 as depicted in FIG. 16.

Figure 18B:
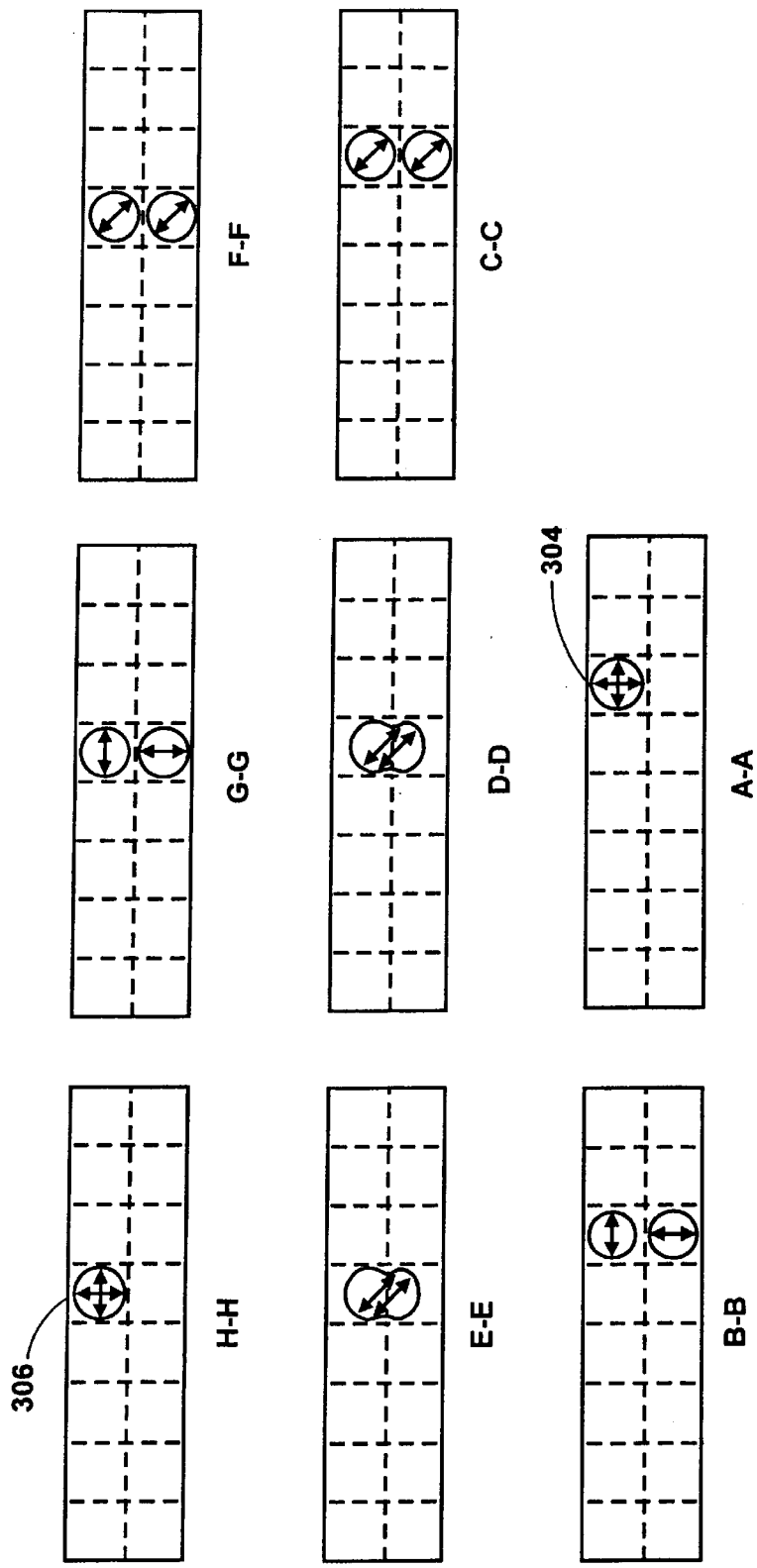

The operation of optical circulator 1600 is illustrated in the cross sectional schematic representations shown in FIGS. 18A–E. FIG. 18A shows how a beam of light entering at first optical port 302 is manipulated so as to arrive at second optical port 306. At cross section A—A the beam is shown entering the first beam displacer/combiner 702. At cross-section B—B, upon exiting first beam displacer/combiner 702, a ray with a vertical polarization vector is shown as being walked off vertically downward from a top ray with a horizontal polarization vector, thus creating a top and bottom ray. In cross-section C—C, upon exiting first nonreciprocal rotators 704A–B, the polarization of the top ray is shown as being rotated 45 degrees counter-clockwise while the bottom ray is shown as being rotated 45 degrees clockwise. First imaging element 400 collimates the polarized rays and bend them to paths which intersect in the center portion 318 of the beam angle turner 308, 312. At cross-section D—D, upon entering the beam angle turner, both of the rays are unchanged in polarization orientation, but have changed their spatial location. At cross-section E—E, upon exiting beam angle turner 308, 312, the propagation directions of the rays is changed from the directions that the rays possessed at cross-section D—D. At cross-section F—F, after passing through second imaging element 708, the rays have been spatially separated. At cross-section G—G, upon exiting second nonreciprocal rotators 710A–B, the polarization of the top ray is shown as being rotated 45 degrees clockwise while the bottom ray is shown as being rotated 45 degrees counter-clockwise. At cross-section H—H, upon exiting second beam displacer/combiner 712, the two rays are recombined to exit at second optical port 306.

FIG. 18B shows how a beam of light entering at second optical port 306 is manipulated so as to arrive at third optical port 304. Cross section H—H shows the beam entering the second beam displacer/combiner 712. At cross-section G—G, a ray with a vertical polarization vector is shown as being walked off vertically downward from a top ray with a horizontal polarization vector, thus creating a top and bottom ray. At cross-section F—F, the polarization of the top ray is shown as being rotated 45 degrees clockwise while the bottom ray is shown as being rotated 45 degrees counter-clockwise. Both polarized rays traveling from second optical port 306 to third optical port 304 are now in the same polarization orientation. The polarization vectors of the proximally propagating rays are perpendicular to the polarization vectors of the distally propagating rays from first optical port 302 to second optical port 306. The orthogonal polarization orientation is due to the nonreciprocity of second nonreciprocal rotators 710A–B. At cross-section E—E, both of the rays are unchanged in polarization orientation but their propagation directions and spatial locations within the cross-section have been changed. Additionally, the beam path of the polarized rays traveling from second optical port 306 to third optical port 304 is different from the polarized rays traveling from first optical port 302 to second optical port 306 because the polarization orientations of the two sets of rays are perpendicular to each other as they travel through beam angle turner 308, 312. At cross-section D—D, upon exiting beam angle turner 308, 312, the propagation directions of the rays is changed from the directions that the rays possessed at cross-section D—D. At cross-section C—C, both of the rays are unchanged in polarization orientation but their propagation directions and spatial locations within the cross-section have been changed. At cross-section B—B, the polarization of the top ray is shown as being rotated 45 degrees clockwise while the bottom ray is shown as being rotated 45 degrees counter-clockwise. At cross-section A—A, the two rays are recombined to exit at third optical port 304.

Figure 18C:
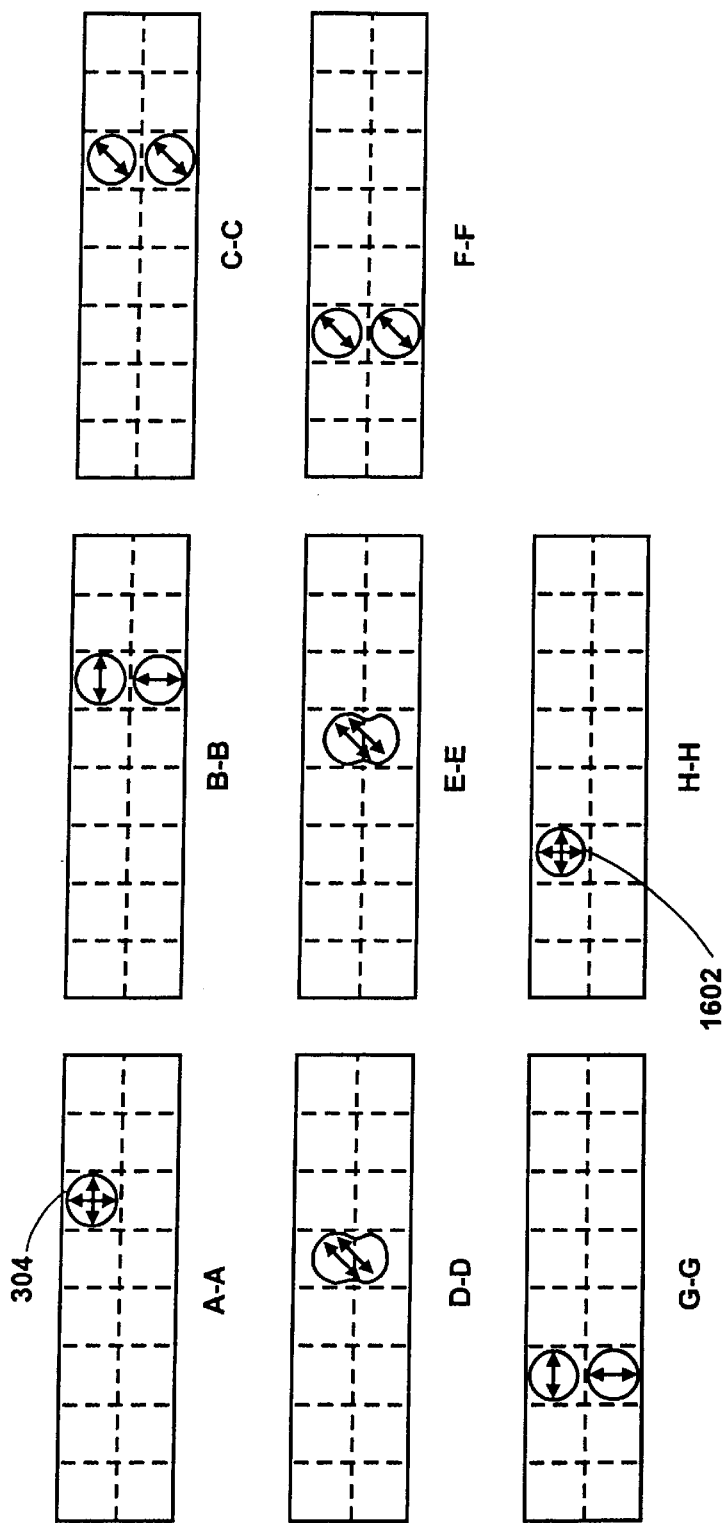

FIG. 18C shows how the light beam entering at third optical port 304 is manipulated so as to arrive at fourth optical port 1602. Cross section A—A shows the beam entering the first beam displacer/combiner 702. At cross-section B—B, upon exiting first beam displacer/combiner 702, a ray with a vertical polarization vector is walked off vertically downward from a top ray with a horizontal polarization vector, thus creating a top and bottom ray. At cross-section C—C, upon exiting first nonreciprocal rotators 704A–B, the polarization of the top rays is shown as being rotated 45 degrees counter-clockwise while the bottom ray is shown as being rotated 45 degrees clockwise. At cross-section D—D, upon entering the beam angle turner, both of the rays are unchanged in polarization orientation, but have changed their spatial location. At cross-section E—E, upon exiting beam angle turner 308, 312, the propagation directions of the rays is changed from the directions that the rays possessed at cross-section D—D. At cross-section F—F, after passing through second imaging element 708, the rays have been spatially separated and their location has been changed. At cross-section G—G, upon exiting second non-reciprocal rotators 710A–B, the polarization of the top ray is shown as being rotated 45 degrees clockwise while the bottom ray is shown as being rotated 45 degrees counter-clockwise. At cross-section H—H, upon exiting second beam displacer/combiner 712, the two rays are recombined to exit at fourth optical port 1602.

Figure 18D:
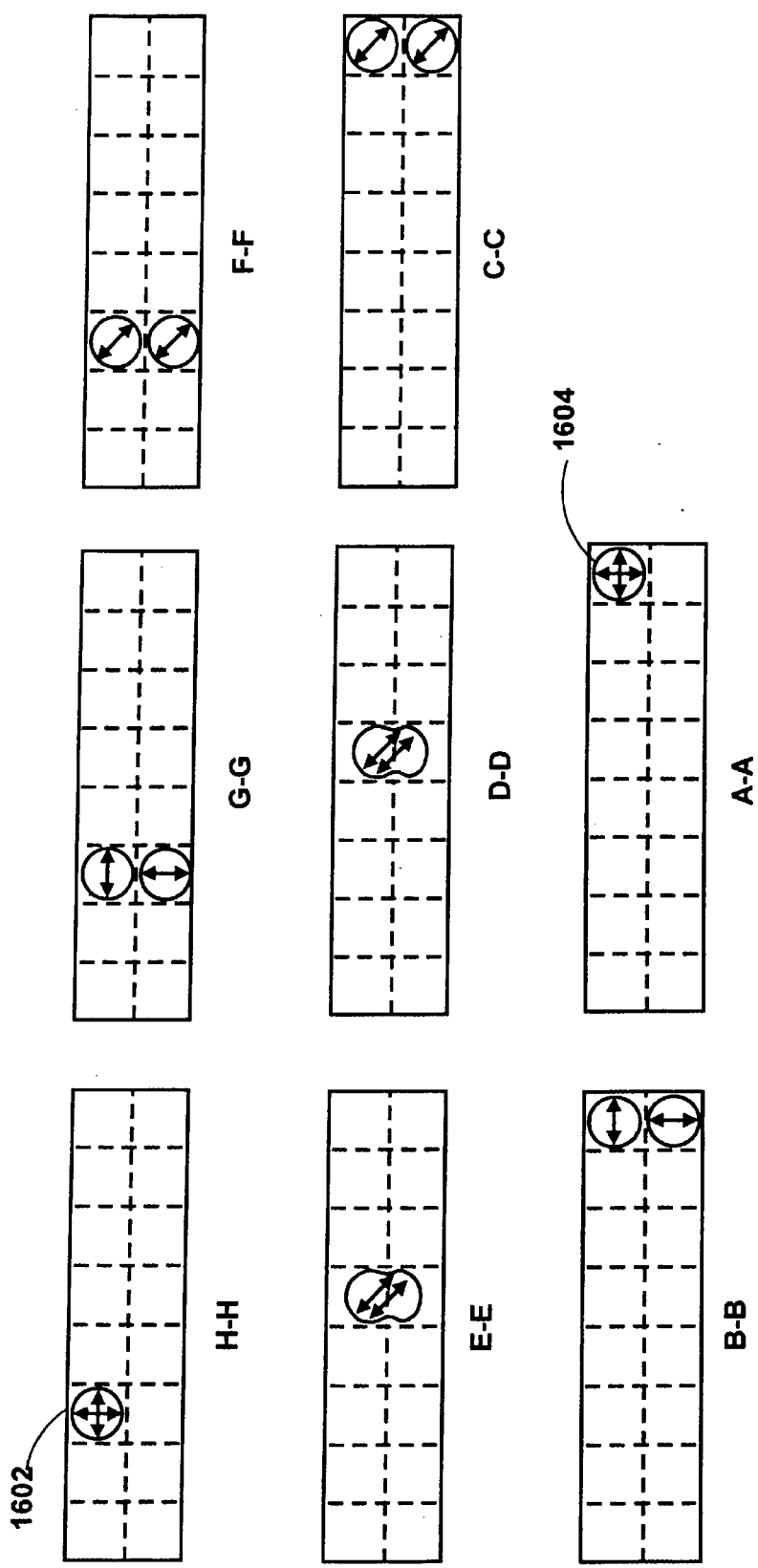

FIG. 18D shows how a beam of light entering at fourth optical port 1602 are manipulated so as to arrive at fifth optical port 1604. Cross section H—H shows the beam entering the second beam displacer/combiner 712. At cross-section G—G, a ray with a vertical polarization vector is shown as being walked off vertically downward from a top ray with a horizontal polarization vector, thus creating a top and bottom ray. At cross-section F—F, the polarization of the top ray is shown as being rotated 45 degrees clockwise while the bottom ray is shown as being rotated 45 degrees counter-clockwise. Both polarized rays traveling from at fourth optical port 1602 to fifth optical port 1604 are now in the same polarization orientation. At cross-section E—E, both of the rays are unchanged in polarization orientation but their propagation directions and spatial locations within the cross-section have been changed. At cross-section D—D, upon exiting beam angle turner 308, 312, the propagation directions of the rays is changed from the directions that the rays possessed at cross-section D—D. At cross-section C—C, both of the rays are unchanged in polarization orientation but their propagation directions and spatial locations within the cross-section have been changed. At cross-section B—B, the polarization of the top ray is shown as being rotated 45 degrees clockwise while the bottom ray is shown as being rotated 45 degrees counter-clockwise. At cross-section A—A, the two rays are recombined to exit at fifth optical port 1604.

Figure 18E:
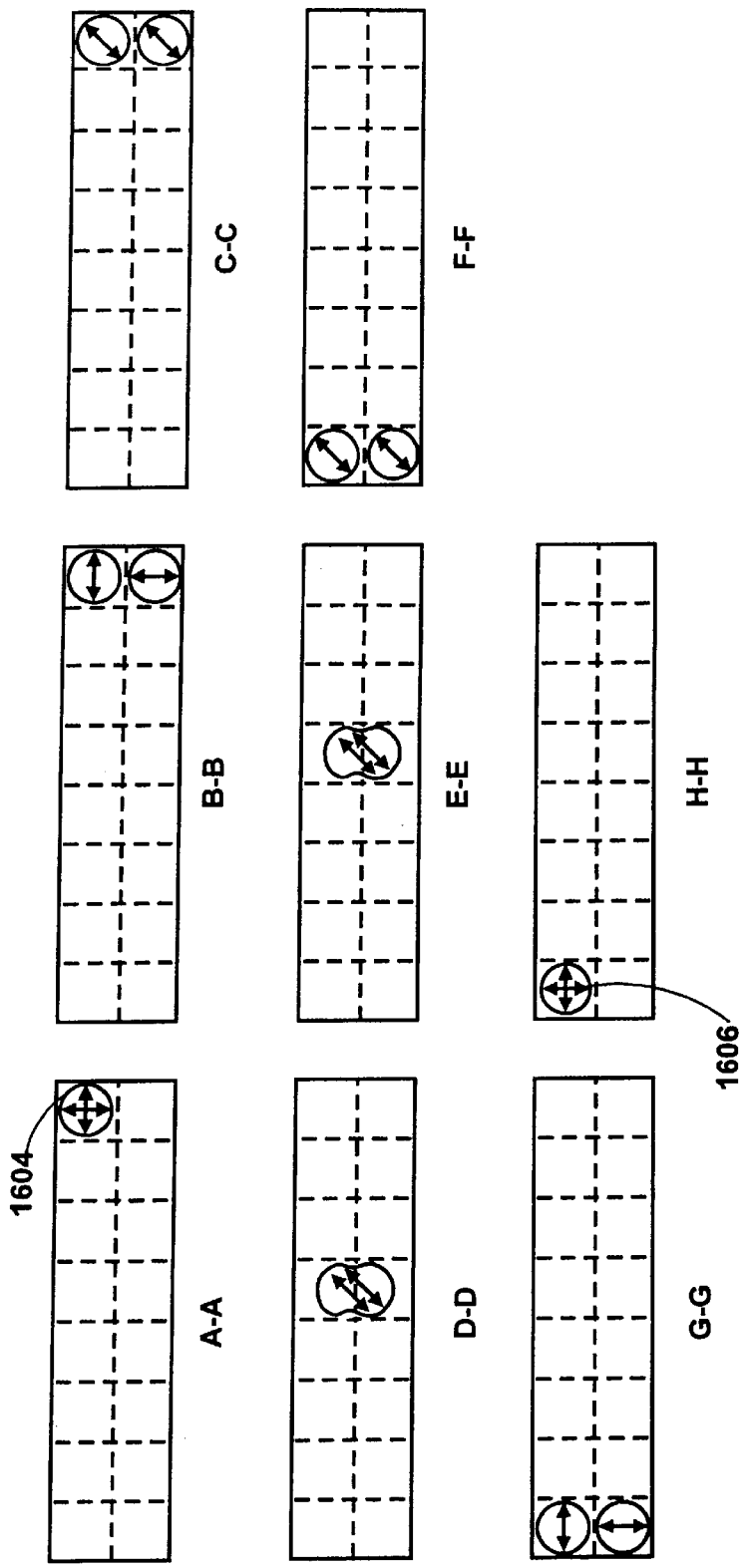

FIG. 18E shows how a beam of unpolarized light entering at fifth optical port 1604 is manipulated so as to arrive at sixth optical port 1606. Cross-section A—A shows the beam entering the first beam displacer/combiner 702. At cross-section B—B, upon exiting first beam displacer/combiner 702, a ray with a vertical polarization vector is walked off vertically downward from a top ray with a horizontal polarization vector, thus creating a top and bottom ray. At cross-section C—C, upon exiting first nonreciprocal rotators 704A–B, the polarization of the top rays is shown as being rotated 45 degrees counter-clockwise while the bottom ray is shown as being rotated 45 degrees clockwise. At cross-section D—D, upon entering the beam angle turner, both of the rays are unchanged in polarization orientation, but have changed their spatial location. At cross-section E—E, upon exiting beam angle turner 308, 312, the propagation directions of the rays is changed from the directions that the rays possessed at cross-section D—D. At cross-section F—F, after passing through second imaging element 708, the rays have been spatially separated. At cross-section G—G, upon exiting second nonreciprocal rotators 710A–B, the polarization of the top ray is shown as being rotated 45 degrees clockwise while the bottom ray is shown as being rotated 45 degrees counter-clockwise. At cross-section H—H, upon exiting second beam displacer/combiner 712, the two rays are recombined to exit at sixth optical port 1606.

Figure 19:
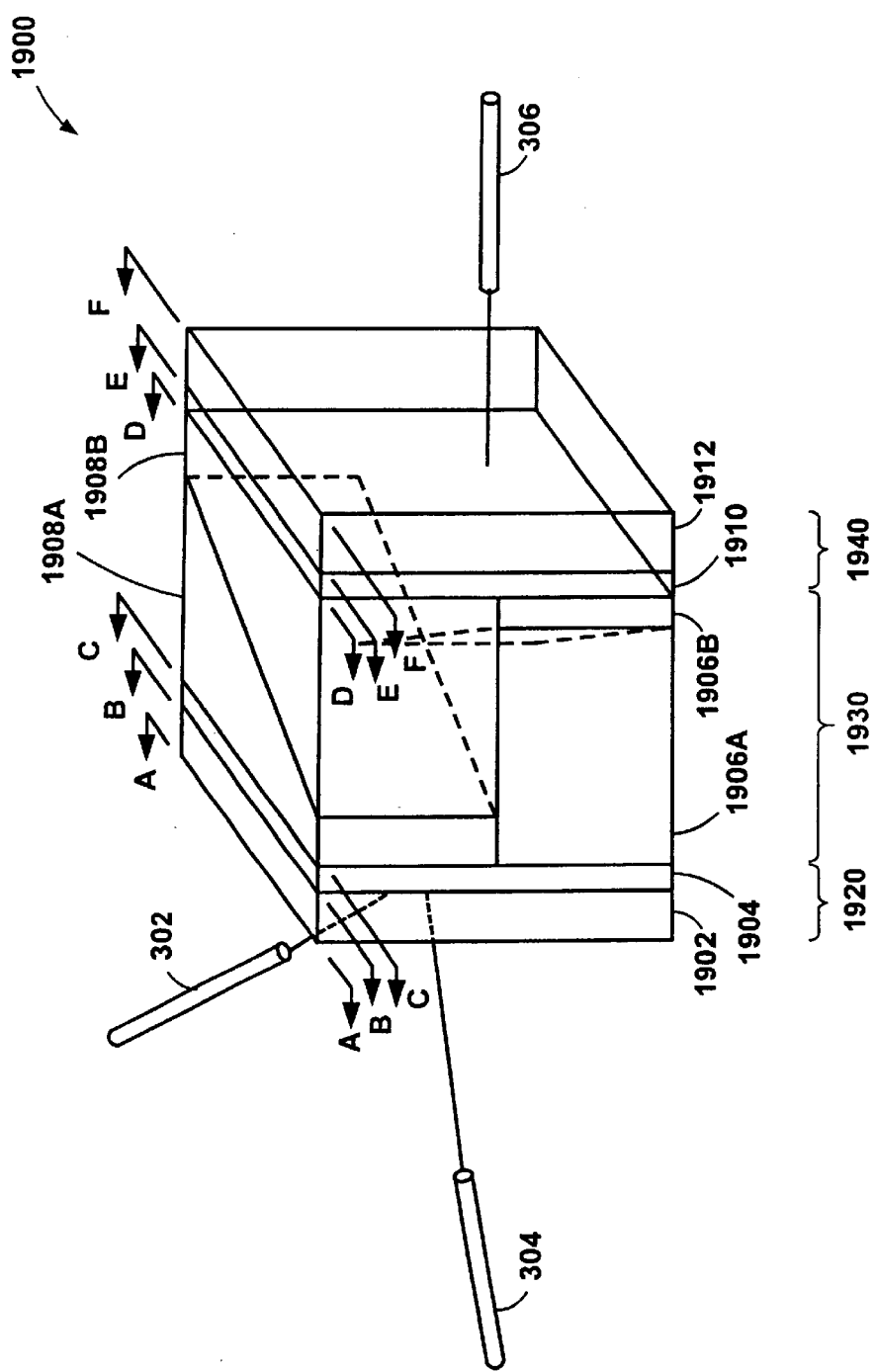
FIG. 19 shows an isometric view of the optical circulator with dual prisms.

FIG. 19 shows a side isometric view of an embodiment of an optical circulator according to the invention with dual beam benders and a pair of non-reciprocal rotators. Shown is optical circulator 1900, including first optical port 302, third optical port 304, second optical port 306, first end portion 1920, center portion 1930, and second end portion 1940. First end portion 1920 includes first beam displacer/combiner 1902 and first nonreciprocal rotator 1904. Center portion 1930 includes first beam angle turner 1906A–B, and second beam angle turner 1908A–B. Second end portion 1940 includes second nonreciprocal rotator 1910, and second beam displacer/combiner 1912.

First end portion 1920 is optically coupled distally to the first and third optical ports, and is located in an opposing relationship to second end portion 1940. First beam displacer/combiner 1902 is optically coupled distally to the first and third optical ports 302 and 304. In a preferable embodiment, first beam displacer/combiner 1902 is a birefringent crystal. First nonreciprocal rotator 1904 comprises a nonreciprocal Faraday polarization rotator and is optically coupled distally from first beam displacer/combiner 1902.

Optically coupled distally to first end portion 1920 is center portion 1930. Included within center portion 1930 are first beam angle turner 1906A–B and second beam angle turner 1908A–B. First beam angle turner 1906A–B and second beam angle turner 1908A–B are optically coupled to first nonreciprocal rotator 1904 distally along the horizontal axis and are optically coupled to one another.

Optically coupled distally to center portion 730, second nonreciprocal rotator 1910 is optically coupled to first beam angle turner 1906A–B and second beam angle turner 1908A–B. Second nonreciprocal rotator 1910 comprises a nonreciprocal Faraday polarization rotator. Second beam displacer/combiner 1912 is optically coupled distally from second nonreciprocal rotator 1910 and proximally from second optical port 306.

In operation, unpolarized light from first optical port 302 enters first beam displacer/combiner 1902, which acts as a polarization sensitive beam displacement plate. The unpolarized light is decomposed into two orthogonal polarization vectors. Within first beam displacer/combiner 1902, the first ray is an ordinary light ray (O-ray) and the other ray is an extraordinary light ray (E-ray). The E-ray walks off vertically from the O-ray through first beam displacer/combiner 1902, with the result that there is a top and bottom ray.

The rays then enter first nonreciprocal rotator 1904. In a preferable embodiment, first nonreciprocal rotator 1904 rotates by 45 degrees counter-clockwise both rays of light passing through it from first optical port 302 to second optical port 306. In another preferred embodiment, the relative directions of rotation imparted by first nonreciprocal rotator 1904 and second nonreciprocal rotator 1910 may be respectively reversed.

Upon exiting first nonreciprocal rotator 1904, both rays may have orthogonal polarization orientations before entering first beam angle turner 1906A–B and second beam angle turner 1908A–B. First beam angle turner 1906A–B and second beam angle turner 1908A–B bends both rays in a polarization dependent manner. The rays then exit first beam angle turner 1906A–B and second beam angle turner 1908A–B and transit through second nonreciprocal rotator 1910. In a preferable embodiment, second nonreciprocal rotator 1910 rotates by 45 degrees counterclockwise both rays of polarized light passing through it from first optical port 302 to second optical port 306. The rays then pass through second beam displacer/combiner 1912, where the beams are recombined. The recombined light beam then passes through second optical port 306. Unpolarized light entering second optical port 306 will travel in the opposite direction. Second nonreciprocal rotator 1910 will direct light along a different optical path towards third optical port 304. This creates optical circulation. The advantage of this embodiment is that only one nonreciprocal rotator instead of a split pair on each side is used.

Figure 20A:
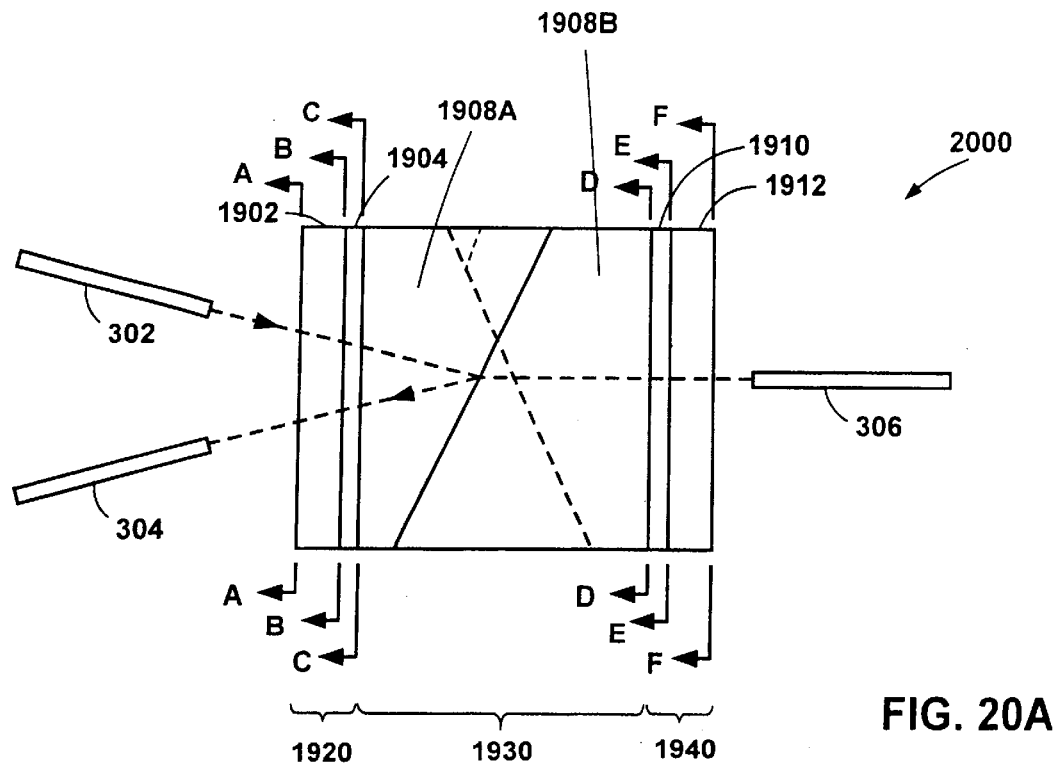
FIGS. 20A–B show top and side views of the optical circulator of FIG. 19.
Figure 20B:
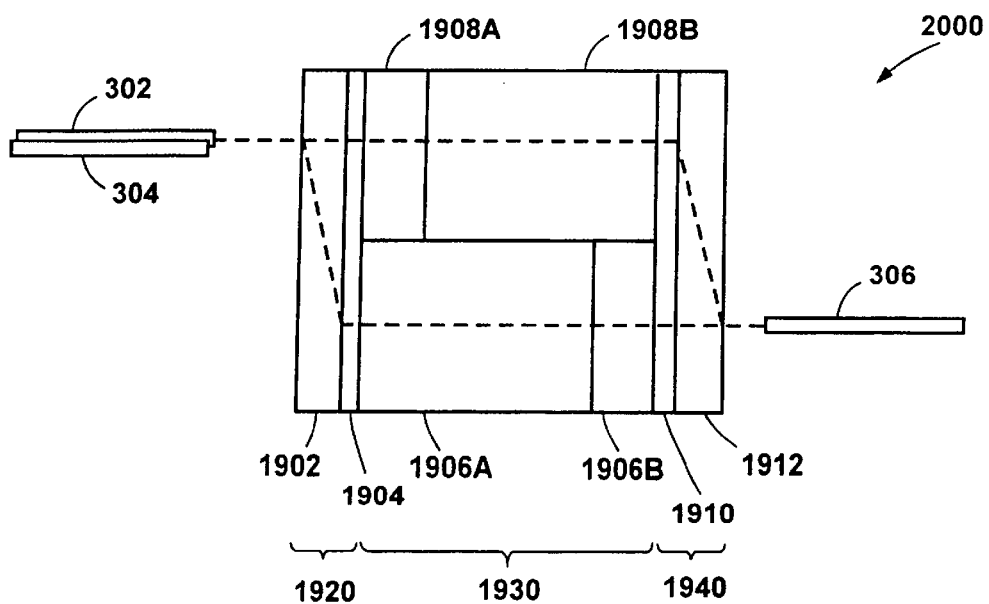

FIGS. 20A–B show top and side isometric views of optical circulator 2000. FIG. 20A shows a top isometric view of optical circulator 2000, together with an internal ray trace, showing directions of the light rays within the circulator. FIG. 20B shows a side isometric view of optical circulator 2000, together with an internal ray trace, showing directions of the light rays within the circulator. Optical circulator 2000 as depicted in FIGS. 20A–B has the same components, structure and operation as optical circulator 1900 as depicted in FIG. 19.

The operation of optical circulator 1900 is illustrated in the cross sectional schematic representations shown in FIGS. 21A–B. FIG. 21A shows how a beam of unpolarized light entering at first optical port 302 is manipulated so as to arrive at second optical port 306. Cross section A—A shows the beam entering the first beam displacer/combiner 702. At cross-section B—B, upon exiting first beam displacer/combiner 702, a bottom ray with a vertical polarization vector is shown as being walked off vertically from a top ray with a horizontal polarization vector. At cross-section C—C, upon exiting first nonreciprocal rotator 1904, the polarization of both the top and bottom rays is shown as being rotated 45 degrees counter-clockwise. At cross-section D—D, upon exiting the first beam angle turner 1906A–B and second beam angle turner 1908A–B, both of the rays are unchanged in polarization orientation, but have changed their spatial location and propagation direction. At cross-section E—E, upon exiting second nonreciprocal rotator 1910, the polarization of the top and bottom rays is shown as being rotated 45 degrees counter-clockwise. At cross-section F—F, upon exiting second beam displacer/combiner 1912, the two rays are recombined to exit at second optical port 306.

FIG. 21B shows how a beam of light entering at second optical port 306 is manipulated so as to arrive at third optical port 304. Cross-section F—F shows the beam entering the second beam displacer/combiner 1912. At cross-section E—E, a ray with a vertical polarization vector is shown as being walked off vertically downward from a top ray with a horizontal polarization vector, thus creating a top and bottom ray. At cross-section D—D, the polarization of both the top and bottom rays is shown as being rotated 45 degrees counter-clockwise. Both polarized rays traveling from second optical port 306 to third optical port 304 are now in an orthogonal polarization orientation. The rays are also perpendicular to the polarization rays traveling from first optical port 302 to second optical port 306. The orthogonal polarization orientation is due to the non-reciprocity of second nonreciprocal rotator 1910. At cross-section C—C, both of the rays are unchanged in polarization orientation but their propagation directions and spatial locations within the cross-section have been changed. Additionally, the beam path of the polarization rays traveling from second optical port 306 to third optical port 304 is different from the polarization rays traveling from first optical port 302 to second optical port 306 because the polarization orientations of the two sets of rays are perpendicular to each other as they travel through first beam angle turner 1906A–B and second beam angle turner 1908A–B. At cross-section B—B, upon exiting first nonreciprocal rotator 1904, the polarization of both the top and bottom ray is shown as being rotated 45 degrees counter-clockwise. At cross-section A—A, the two rays are recombined to exit at third optical port 304.

It will be apparent to those skilled in the art that various modifications and variations can be made in the circulators, systems and methods of the present invention without departing from the spirit or scope of the invention. Thus, it is intended that the present invention cover the modifications and variations of this invention provided they come within the scope of the appended claims and their equivalents.

What is claimed is:

1. An optical circulator apparatus having a longitudinal axis and a first and third port positioned at a proximal end of the apparatus and a second port positioned at a distal end of the apparatus, said optical circulator comprising:
   a first dividing and combining element positioned adjacent the first and third port and adapted to divide a beam into two beams of orthogonal polarizations and to combine two beams of orthogonal polarizations into one beam;
   a compound polarization-dependent beam guiding element configured to transmit a beam in a predetermined direction responsive to a polarization orientation of the beam such that light from the first port is transmitted towards the second port and light from the second port is transmitted towards the third port;
   a second dividing and combining element positioned adjacent the second port and adapted to divide a beam into two beams of orthogonal polarizations and to combine two beams of orthogonal polarizations into one beam;
   a first imaging element positioned intermediate the first dividing and combining element and the beam guiding element;
   a second imaging element positioned intermediate the beam guiding element and the second dividing and combining element; and
   first and second reciprocal polarization rotators configured to render two orthogonal polarization vectors parallel or two parallel polarization vectors orthogonal,
   wherein the first imaging element is sandwiched between the first reciprocal polarization rotator and the beam guiding element and the second imaging element is sandwiched between the beam guiding element and the second reciprocal polarization rotator, and,
   wherein said beam guiding element comprises a modified Wollaston prism, or a modified Rochon prism.

2. The device of claim 1 wherein said modified Wollaston prism comprises first and second birefringent wedges each having a substantially perpendicular planar wedge surface, wherein at least one of said first or second wedges has an optic axis which is oriented at an angle of 45 degrees relative to a respective one of said first or second wedge surface.

3. The device of claim 2 wherein said first and second wedges have optic axes which are perpendicular to one another.

4. The device of claim 2 wherein each of said first and second wedges have optic axes which are oriented at an angle of 45 degrees relative to said respective first and second wedge surfaces.

* * * * *